(12) United States Patent
Hamer et al.

(10) Patent No.: US 8,935,202 B2
(45) Date of Patent: Jan. 13, 2015

(54) MANAGING CHANGES IN A RELATIONSHIP MANAGEMENT SYSTEM

(75) Inventors: Terry Hamer, Naperville, IL (US); Ralph Edward Brendler, Mokena, IL (US)

(73) Assignee: Reed Elsevier Inc., Waltham, MA (US)

( * ) Notice: Subject to any disclaimer, the term of this patent is extended or adjusted under 35 U.S.C. 154(b) by 1305 days.

(21) Appl. No.: 10/876,236

(22) Filed: Jun. 25, 2004

(65) Prior Publication Data

US 2005/0004928 A1    Jan. 6, 2005

Related U.S. Application Data

(63) Continuation-in-part of application No. 10/675,431, filed on Sep. 30, 2003.

(60) Provisional application No. 60/414,713, filed on Sep. 30, 2002.

(51) Int. Cl.
*G06F 17/30* (2006.01)
*G06Q 10/10* (2012.01)

(52) U.S. Cl.
CPC .................................... *G06Q 10/10* (2013.01)
USPC ............................ 707/610; 709/205; 709/225

(58) Field of Classification Search
USPC ........ 707/101, 104.1, 100, 610; 709/200, 225
See application file for complete search history.

(56) References Cited

U.S. PATENT DOCUMENTS

| | | | |
|---|---|---|---|
| 6,115,709 A | 9/2000 | Gilmour et al. | |
| 6,269,369 B1 * | 7/2001 | Robertson | 707/1 |
| 6,324,541 B1 * | 11/2001 | de l'Etraz et al. | 707/104 |
| 6,415,329 B1 | 7/2002 | Gelman et al. | |
| 6,564,264 B1 | 5/2003 | Creswell et al. | |
| 6,640,229 B1 | 10/2003 | Gilmour et al. | |
| 6,820,204 B1 * | 11/2004 | Desai et al. | 726/6 |
| 7,003,546 B1 * | 2/2006 | Cheah et al. | 709/200 |
| 7,010,599 B2 * | 3/2006 | Shrinivasan et al. | 709/225 |
| 2002/0194178 A1 | 12/2002 | Gilmour et al. | |
| 2003/0050911 A1 * | 3/2003 | Lucovsky et al. | 707/1 |

OTHER PUBLICATIONS

International Search Report for PCT/US03/30846 dated Apr. 13, 2004.

* cited by examiner

*Primary Examiner* — Apu Mofiz
*Assistant Examiner* — Chelcie Daye
(74) *Attorney, Agent, or Firm* — Marshall Gerstein & Borun LLP

(57) ABSTRACT

A relationship management system stores multiple versions of contact information for a particular contact by storing the contact information that is available to all of the users of system that know a particular contact in a firm collection and by storing information about the particular contact that is available to a limited number of users that know the particular contact in one or more user collections. When changes are made to the user collection for a particular contact, the system detects the change, and based upon a number of administrative rules determines whether the change should be contributed to the firm collection. The system may automatically make the corresponding changes to each of the contact files within the firm collection or may recommend to the user whether the change should be promoted, allowing the users to accept or reject the recommendation. Preferably, each user will be provided with a default number of days to accept or reject the recommendation, after which the system may promote the contact information automatically.

14 Claims, 18 Drawing Sheets

| Manage Follow-up Text | | | | | [?][X] |
|---|---|---|---|---|---|
| Follow-up Text | | | | | |
| Category | Item | Action | Text | Priority | Close |
| * Edit | Address | Add | | | |
| Edit | Address | Edit | Follow-up text goes here. | Normal | Edit... |
| Edit | Address | Delete | | | |
| Edit | Address | Suspect | | | |
| Edit | Address | Format | | | |
| Contact Type | Client | Add | | | |
| Contact Type | Client | Remove | | | |
| Contact Type | Expert | Add | | | |
| Contact Type | Expert | Remove | | | |
| Duplicate Contact | | | Follow-up text goes here. | High | |
| User Request | | | Follow-up text goes here. | Normal | |

*=Inactive

MANAGING CHANGES IN A RELATIONSHIP MANAGEMENT SYSTEM

CROSS REFERENCE TO RELATED APPLICATIONS

This application is a continuation-in-part of U.S. patent application Ser. No. 10/675,431, entitled "Managing Changes in a Relationship Management System", filed Sep. 30, 2003, which is a non-provisional application claiming priority from U.S. Provisional Patent Application Ser. No. 60/414,713, also entitled "Managing Changes in a Relationship Management System," filed Sep. 30, 2002, which are both incorporated herein by reference in their entirety.

FIELD OF THE INVENTION

The present invention relates generally to relationship management systems and, more particularly, to a manner of managing changes made to contact information within a relationship management system having a plurality of user collections and a firm collection.

DESCRIPTION OF RELATED ART

Relationship management systems typically use one or more relational databases to, for example, store data or information pertaining to contacts, which may be individual persons, corporations, etc. The information stored in the database for any particular contact may include, for example, phone numbers, facsimile numbers, post office addresses, electronic-mail (e-mail) addresses, etc. and this information may be used to produce mailing lists and customer lists, to send facsimiles, e-mails, or to store contact information to be retrieved at any desired time. One of the simplest and most common uses of a relationship management system is as a centralized electronic address book that can be used by any number of individuals or groups within, for example, a corporation, a law firm, etc. for any number of reasons, such as keeping track of contact information, making sales calls, sending letters, facsimiles, e-mails, etc.

In the past, there have been two basic paradigms for managing the contact information of different individuals as stored in the database. According to the first paradigm, each user of the database has his or her own contact information stored separately in the database. Thus, if two users of the relationship management system desire to store information about the same person or contact (because both users know this contact), two separate sets of records or data are stored for that contact, even though some or all of the information about the contact, as stored by both users, may be the same. In this type of system, the users may be provided access to some are all of other users' contact information, with this access being controlled by security procedures configured by each of the users. However, absent being given the proper clearance, users do not have access or even knowledge of the information stored by other users of the system.

According to the second paradigm, the relationship management system stores each of the different types of contact information (such as names, post office, street or e-mail addresses, facsimile and phone numbers, company affiliations, titles, etc.) in a database only once and uses folders to provide access to the stored contact information to any number of the users of the relationship management system. Each contact stored within the database may be referenced by any number of folders and each folder typically has access rights that define one or more users of the relationship management system that can access the folder and, thereby, access the contact information associated with the contacts referenced by the folder. There may be different types of folders, such as private or personal folders in which personal contacts, business contacts, etc. are referenced, business folders, group folders set up for specific groups of users, task folders set up for specific tasks, etc. A user having access to a folder may add, change or delete the contact information for any of the contacts referenced by the folder and may add new contacts and associated contact information to the database by adding a new contact to the folder. Each folder may reference more than one contact and each contact may be referenced by more than one folder. Thus, for example, if two users know the same person (a contact), the personal or private folders for each of these users may reference that contact and, thus, each of these users may have access to the contact information associated with that contact, even though the contact information for that contact is stored only once in the database.

Both of these paradigms, however, have certain problems or inefficiencies when managing changes to be made to the contact information stored in the database. In the first paradigm, a certain user may know of a change in contact information, such as a particular contact moving or getting a new phone number, and update his or her contact information as stored in the database. However, other users which also have contact information stored about that contact may not be aware of the change in the contact information and, as a result, will not know to change their information for the same contact as stored in the database. Thus, in this paradigm, it is difficult to keep all of the contact information accurate because each and every "version" of the information for a particular contact must be changed manually by the users having access to those different "versions" of the contact information.

In the second paradigm, any user having a folder which references a particular contact may be able to change the information stored for that particular contact and, thus, when one user becomes aware of a change in contact information and makes the change to the database, all other users immediately have access to that changed information. However, in this case, some users may not want to have access only to the most recently entered contact information as there is no guarantee that the most recently entered contact information is correct. In fact, in some cases, a user making a change to contact information as stored in the database may be wiping out correct information about a contact and replacing it with older or incorrect information. Nonetheless, once changed, this contact information is changed for all users and now none of the users have access to the correct information, even though others of the users, who may have greater knowledge about or a more intimate relationship with the contact, would know that the new information is incorrect. Still further, in some cases, the newly entered information may be temporary only and may, at some point, change back to the way it was stored in the database prior to being changed. This situation may arise, for example, when a contact is going on a sabbatical or making an extended stay at a temporary address, but is eventually returning to the address currently stored in the database for the contact. In this case, some users may only want access to the older or more permanent information because they will not need the new and temporary information.

In either case, making changes to the contact information may cause certain problems for some users of the relationship management system. These problems may cause users of the relationship management system to doubt its accuracy (e.g., in the case of the second paradigm) because others can change the contact information at will, or to view the relationship management system as less than completely helpful because information about a particular contact, as stored by another user of the system, is not immediately made available to all the users of the system that know that particular contact.

In still other cases, a user may make a change to his or her user collection and wish to retain the changed information solely within their own user collection, thereby keeping the contact information private. If, however, users continually keep information in their private folders to themselves, any communal benefit gained from sharing contact information becomes more difficult to achieve as each user becomes responsible for their own data, and valuable information regarding a contact may not be shared within the entity, leading to inaccurate information and/or missed opportunities. Recognizing the fact that users typically have some information regarding contacts that they may not which to share with the collective, the administrator may recommend standards for sharing contact information, and may try to implement these standards on an "honor" system, wherein each user is requested to follow the guidelines. In these instances, however, a recommended standard may not have the desired effect as the adherence to the implementation of rules on data sharing by the users may be difficult to both monitor and enforce. Thus, there is a continual need to automate the implementation of an administrator's data sharing rule sets.

DESCRIPTION OF THE DRAWINGS

FIG. 5 is a screen display illustrating an example display screen that may be provided to a firm administrator by one of the routines of FIG. 4 for use in managing the changes made to the databases of FIGS. 2, 2A, 2B, 2C, and 3;

FIG. 7 is a third screen display illustrating an example display screen that may be provided to a firm administrator by one of the routines of FIG. 4 for use in managing the changes made to the databases of FIGS. 2, 2A, 2B, 2C, and 3;

FIG. 8 is a fourth screen display illustrating an example display screen that may be provided to a firm administrator by one of the routines of FIG. 4 for use in managing the changes made to the databases of FIGS. 2, 2A, 2B, 2C, and 3;

FIG. 9 is a fifth screen display illustrating an example display screen that may be provided to a firm administrator by one of the routines of FIG. 4 for use in managing the changes made to the databases of FIGS. 2, 2A, 2B, 2C, and 3;

DETAILED DESCRIPTION

Figure 1:
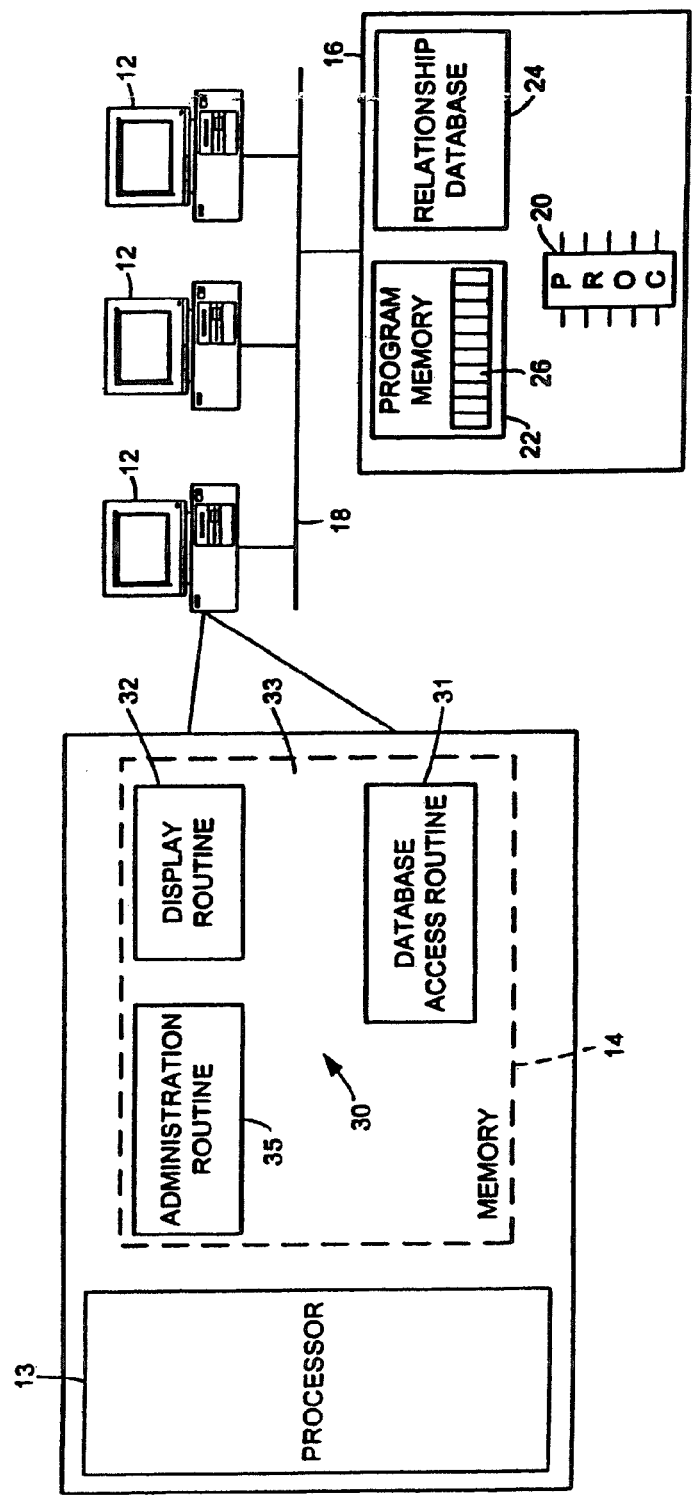
FIG. 1 is a block diagram of an information system network on which a relationship management system may be implemented.

Referring now to FIG. 1, an information network 10 on which a relationship management system can be implemented is illustrated. The information network 10 includes a number of workstations or user interfaces 12, each having an associated processor 13 and a memory 14, interconnected with a server 16 via a communication link 18 which may be, for example, a local area network (LAN) link of any desired construct or nature. The information network 10 may include any desired number of user interfaces 12 and each of the user interfaces 12 may include any desired type of computer or processor that uses any operating system, such as the Microsoft Windows® operating system, a UNIX operating system, etc. to execute programs or applications. Likewise, the server 16 may be any suitable or desired type of server having a processor 20, a program memory 22 and a relationship database 24. The server 16 may be, for example, a Microsoft SQL database server, an Oracle database server, etc. While the server 16 is illustrated as being a stand-alone unit, the server 16 could be integrated into one of the user interfaces 12 or into any other suitable processing device, if so desired. Still further, the LAN 18 may be any desired type of LAN connection such as a Microsoft NT or a Novel Netware, or may any other desired type of communication network. While the LAN 18 preferably uses a TCP/IP protocol, any other communication protocol may be used as well to provide communications between the user interfaces 12 and the server 16. Of course, if desired, the communication link 18 could be a wide area network (WAN) instead of a LAN.

The relationship database 24 stores information about any number of contacts, which may be persons, corporations, organizations or other entities. Generally speaking, the relationship database 24 stores a different user collection for each individual user of the relationship management system as well as a firm collection. Each user collection includes a contact file for each of the contacts known by the user who owns or is associated with that user collection and each contact file within the database 24 may include different contact information fields that store different types of contact information for a contact. The contact information may include, but is not limited to, name information, title and position information, employer information, post office, street and electronic address information, home and business phone number and facsimile number information, professional organization information, how the user knows the contact, etc. Similarly, the firm collection includes a contact file for some or all of the contacts stored in any of the user collections and, generally speaking, the firm collection will include a single contact file for each of the different contacts stored in any of the user collections. Each of the contact files within the firm collection may have the same, greater or fewer information fields as one or more of the corresponding contact files for that contact within the user collections. In one embodiment, the database 24 also stores identification fields that connect or associate the contact files for the same contact within the different user collections with the contact file within the firm collection for that contact. Thus, an identification connection table may store a contact identification (ID) pair, wherein one of the IDs is the ID of a contact file within one of the user collections for a particular contact and the second of the IDs is the ID of the contact file for that same contact within the firm collection. This information can be used to associate changes made to a contact file within a user collection for a particular contact with changes to be made to the contact file within the firm collection for that particular contact.

Using the database construct described above, it will be understood that a number of different contact files can be stored for any particular contact. For example, there may be a contact file for a particular contact within each of multiple different user collections (all of whom know the contact in some manner) as well as a firm contact file for that particular contact. Each of these contact files may have the same or slightly different information stored therein depending on what is stored in these contact files by the different users and what, if any, information is released to the firm contact file for that contact by each of the users.

As illustrated in FIG. 1, the server 16 includes a set of change management routines or applications 26 stored in the program memory 22. The routines 26 may be used to access, store, delete, change and manage the data stored in the database 24, and may include web service access routines, communication routines, synchronization routines, etc. As illustrated for one of the user interfaces 12 in FIG. 1, the relationship management system also includes relationship management routines 30 stored in each of the user interfaces 12. The routines 30 are executed on the processor 13 of the user interfaces 12 and may include a database access routine 31 that communicates with the server 16 to access data within the server 16 using any desired type of communication layer. The database access routine 31, if desired, may use a database driver, such as the Microsoft DB-LIB driver, to perform communications with the database within the server 16. The routines 30 also include a display routine 32 which, as is typical in relationship management systems, creates user interface screens for display on a display screen or other display device associated with the user interface 12 to enable communication with the user via the user interface 12. The routines 31 and 32 operate together to enable a user to enter information, such as contact information related to persons or corporations or other entities to be stored in the database 24, to delete information from the database 24, to access information stored in the database 24, etc. The user may also use the routines 31 and 32 to perform functions using either the contact information stored in the user collection owned by that user or the contact information stored within the firm collection, such as to send e-mails, facsimiles or regular mail, to create mailing lists, customer lists, etc.

If desired, one or more of the user interfaces 12 may also or instead store one or more firm administration routines 35 which may be used to monitor and provide data integrity services with respect to the data stored in the database 24. One or more other applications, such as other database access routines may be stored on the user interface 12 and may be used in conjunction with the relationship database 24, such as Microsoft Excel routine, Microsoft Outlook, personal data administrator (PDA) routines etc. Of course, the relationship management system may have many other uses and may include other applications as well.

Figure 2:
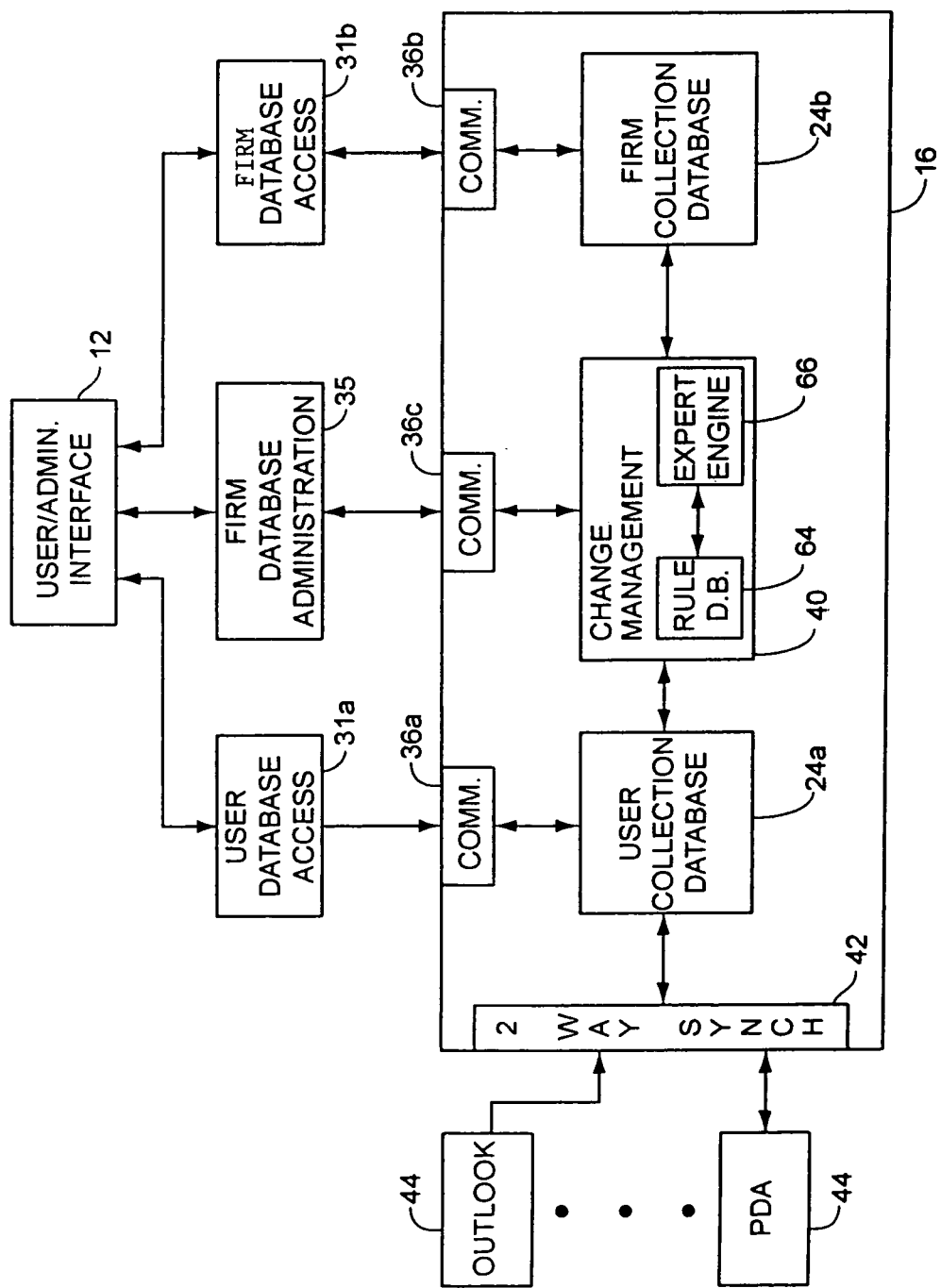
FIG. 2 is a data flow diagram illustrating data flow between different elements of the relationship management system of FIG. 1.

FIG. 2 illustrates a logical block of a data flow and manipulation structure that may be used to coordinate changes made within the database 24 to provide more optimal data sharing between users of the relationship management system described herein. As illustrated in FIG. 2, the server 16 includes a user collection database 24a that stores contact files associated with each of the different user collections and a firm collection database 24b that stores contact files associated with the firm collection. User database access routines 31a (which may be executed in, for example, one of the user interfaces 12) access the user collection database 24a via a communication interface 36a, which may be any desired type of communication layer or interface, to provide information to users via one of the user displays 12, to allow a user to access, use and change the contact information stored within the user collections associated with or owned by that user, as well as to change or specify the manner in which contact information within that user's contact collection is to be shared with the firm collection. Likewise, firm database access routines 31b communicate with the firm collection database 24b via a communication interface 36b (which may be the same interface as the communication interface 36a if desired) to allow users to access and use, and in some cases, change, the contact information stored within the firm collection. The firm database access routines 31b may include, for example, mass mailing applications, searching applications, etc.

During operation of the relationship management system, based on preferences selected by the users, changes made to contact information within the contact files of the user collections within the user collection database 24a may be sent to and reflected within the firm collection for that contact and, similarly, changes made to contact information within a contact file of the firm collection may be reflected in one or more of the user collections having contact files for that contact. To provide this functionality, one or more change management routines or applications 40 detect changes made to contact information within the user collections of the user collection database 24a and, if such information is to be shared with the firm collection, send that information to the firm collection database 24b for that contact. The change management routines 40 may automatically make the specified change to the firm collection, may provide a message to a firm administrator or gate keeper as to the nature of the change and request approval of the change before making the change to the contact file within the firm collection, or may make the change to the firm collection and notify the firm administrator or gatekeeper of the change. To provide this functionality, the change management routines 40 may send messages to the firm administration applications 35 via a communication interface 36c (which may be the same interface as the interfaces 36a and 36b). In turn, the administration routines 35 may provide messages and other information to the firm administrator via one of the user interfaces 12.

Furthermore, if desired, a two-way synch application 42 may communicate directly with other standard or known programs, such as Outlook or PDA programs 44 to provide updates made in these programs to the contact information stored within the user collection database 24a. These two-way synch applications 42 are well known and thus will not be described in more detail herein. Generally, however, these two-way synch programs 42 recognize changes made to contact information stored within the other databases, such as an Outlook database, a PDA database, etc. and synch those changes to the contact information within the user collection database 24a for the appropriate user so that, on a user by user basis, the user contact information within the user database 24a reflects the contact information stored in the Outlook, PDA or other file for that user (or vice versa). In this manner, the contact information within the user database 24a can be automatically changed based on changes made by a user in a different program, such as Outlook, PDA programs, etc.

As will be understood from the diagram of FIG. 2, each of the different users of the relationship management system may have access to and make changes to contact information stored within the user database 24a in a user collection owned by that user or to which that user otherwise has security access. These changes may be then sent to and reflected in the contact file for that contact stored within the firm collection with the change management routines 40 and the firm administration routines 35 providing a firm administrator the ability to manage and oversee the changes being made to the firm contact information in any number of ways, such as any of those described herein. Likewise, changes made to firm contact information for a particular contact may be sent back to each of the user collections which reference or have a contact file for that particular contact and these changes may be made to the contact information within the different user collections based on preferences specified by the different users. Thus, for example, some users of the relationship management system may allow changes made to the firm contact for a particular contact to be automatically reflected in that user's contact file for that contact while not allowing other changes within the firm contact file to be reflected within that users' contact files without specifically accepting the change.

Figure 2A:
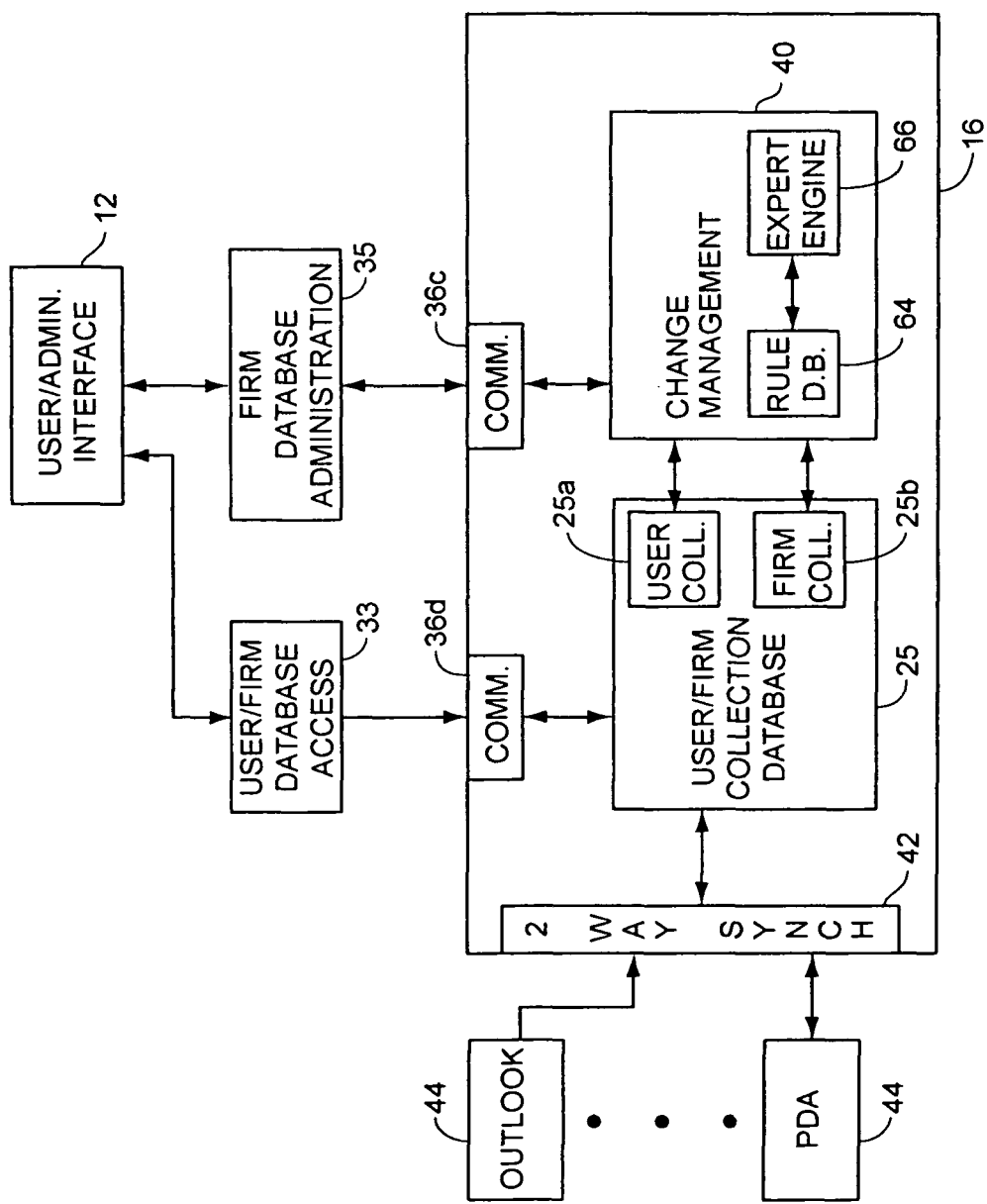
FIG. 2A is a data flow diagram illustrating another embodiment of data flow between different elements of an embodiment of the relationship management system of FIG. 1.

FIG. 2A illustrates an alternative embodiment of a logical block of a data flow and manipulation structure that may be used to coordinate changes made within the database 24 to provide more optimal data sharing between users of the relationship management system described herein. As illustrated in FIG. 2A, the user collection database 24a and firm collection database 24b of FIG. 2 may be combined into a single user/firm collection database 25 having user collections 25a and a firm collection 25b. Specifically, the server 16 includes a user/firm collection database 25 that stores contact files associated with each of the different user collections 25a and the firm collection 25b. It will be understood that the user/firm collection database 25 may store each contact files associated with each of the different user and firm collections 25a, 25b, in any known manner, including, for example, separate database tables. User/firm database access routines 33 (which may be executed in, for example, one of the user interfaces 12) access the user/firm collection database 25 via a communication interface 36d, which may be any desired type of communication layer or interface, to provide information to users via one of the user displays 12, to allow a user to access, use and change the contact information stored within the user collections 25a associated with or owned by that user within the user/firm collection database 25. The communication interface 36d may also allow a user to change or specify the manner in which contact information within that user's contact collection is to be shared with the firm collection 25b stored within the user/firm collection database 25.

During operation of the relationship management system, based on preferences selected by the users, changes made to contact information within the contact files of the user collections 25a within the user/firm collection database 25 may be sent to and reflected within the firm collection 25b for that contact and, similarly, changes made to contact information within a contact file of the firm collection 25b may be reflected in one or more of the user collections 25a having contact files for that contact. To provide this functionality, one or more change management routines or applications 40 detect changes made to contact information within the user collections 25a of the user/firm collection database 25 and, if such information is to be shared with the firm collection 25b, send that information to the firm collection 25b for that contact. The change management routines 40 may automatically make the specified change to the firm collection 25b, may provide a message to a firm administrator or gate keeper as to the nature of the change and request approval of the change before making the change to the contact file within the firm collection 25b, or may make the change to the firm collection 25b and notify the firm administrator or gatekeeper of the change. To provide this functionality, the change management routines 40 may send messages to the firm administration applications 35 via a communication interface 36c (which may be the same interface as the interface 36d). In turn, the administration routines 35 may provide messages and other information to the firm administrator via one of the user interfaces 12.

Figure 2B:
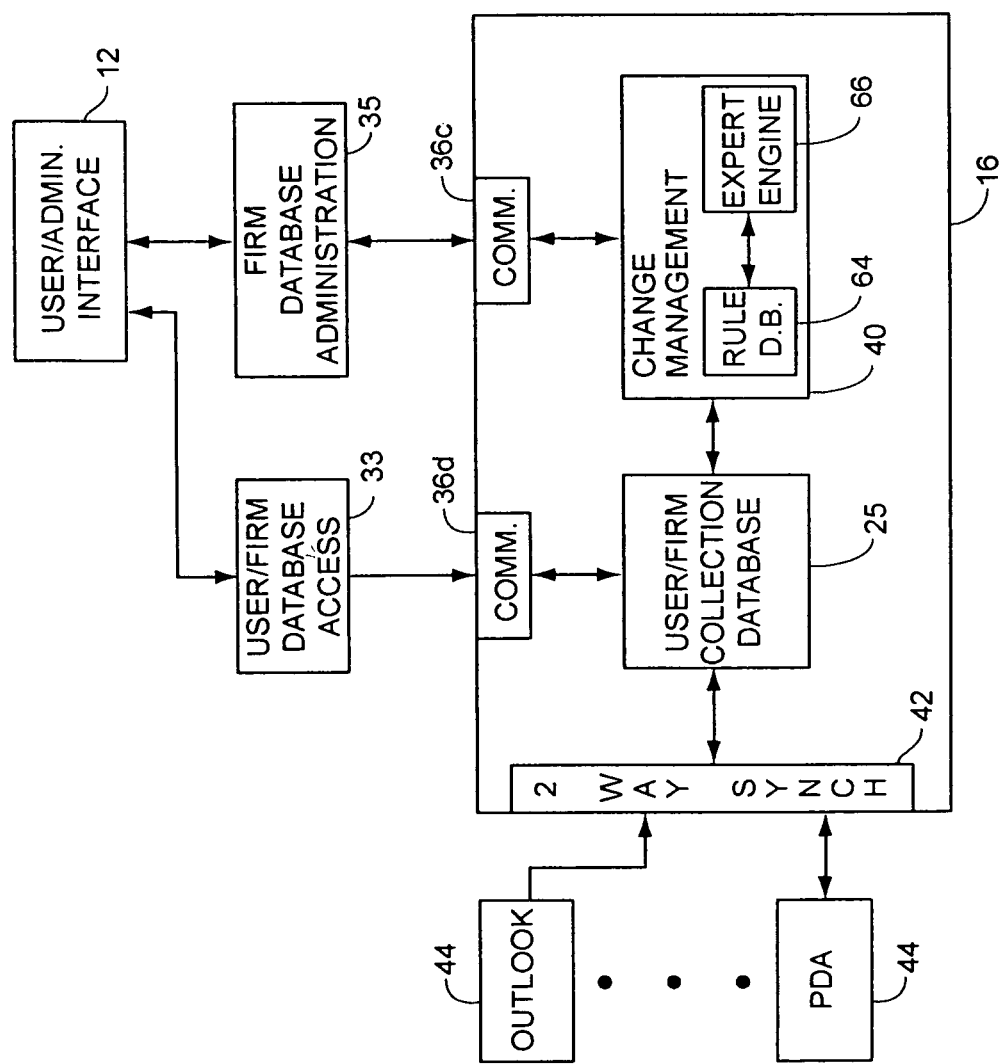
FIG. 2B is a data flow diagram illustrating yet another embodiment of data flow between different elements of an embodiment of the relationship management system of FIG. 1.

FIG. 2B illustrates another alternative embodiment of a logical block of a data flow and manipulation structure that may be used to coordinate changes made within the database 24 to provide more optimal data sharing between users of the relationship management system described herein. As illustrated in FIG. 2B, the user collection database 24a and firm collection database 24b of FIG. 2 may be eliminated, and a single collection of both user and firm information combined into a single user/firm collection database 25 may be provided, wherein each user may have access to each single contact record. Specifically, in the disclosed embodiment, the server 16 includes a user/firm collection database 25 that stores contact files associated with each of the different system contacts. In other words, the user/firm collection database 25 may store each of the different types of contact information (such as names, post office address, etc) in the database 25 only once, and each user may access the contact information for any of the contacts for which they have access permission. User/firm database access routines 33 (which may be executed in, for example, one of the user interfaces 12) access the user/firm collection database 25 via a communication interface 36*d*, which may be any desired type of communication layer or interface, to provide information to users via one of the user displays 12, to allow a user to access, use and change any of the contact information stored within the user/firm collection database 25.

During operation of the relationship management system, based on preferences selected by the users, changes made to contact information within the contact files of the user/firm collection database 25 may be sent to one or more change management routines or applications 40. The change management routines 40 may automatically make the specified change to the contact file, may provide a message to a firm administrator or gate keeper as to the nature of the change and request approval of the change before making the change to the contact file, or may make the change to the firm collection 25*b* and notify the firm administrator or gatekeeper of the change. To provide this functionality, the change management routines 40 may send messages to the firm administration applications 35 via a communication interface 36*c* (which may be the same interface as the interface 36*d*). In turn, the administration routines 35 may provide messages and other information to the firm administrator via one of the user interfaces 12.

Figure 2C:
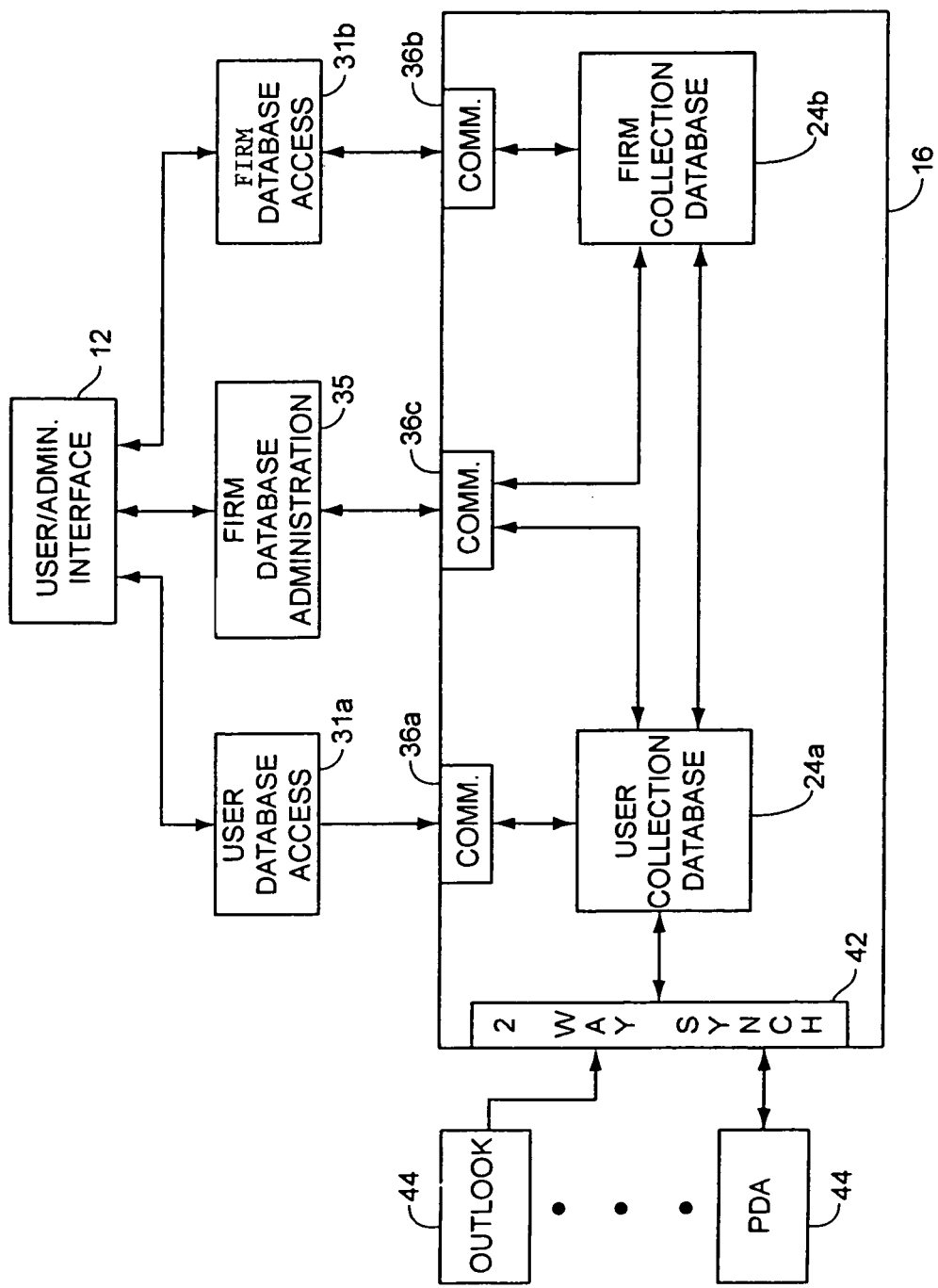
FIG. 2C is a data flow diagram illustrating still another embodiment of data flow between different elements of an embodiment of the relationship management system of FIG. 1.

FIG. 2C illustrates still another alternative embodiment of a logical block of a data flow and manipulation structure that may be used to coordinate changes made within the database 24 to provide more optimal data sharing between users of the relationship management system described herein. As illustrated in FIG. 2C, the server 16 includes a user collection database 24*a* that stores contact files associated with each of the different user collections and a firm collection database 24*b* that stores contact files associated with the firm collection. User database access routines 31*a* (which may be executed in, for example, one of the user interfaces 12) access the user collection database 24*a* via a communication interface 36*a*, which may be any desired type of communication layer or interface, to provide information to users via one of the user displays 12, to allow a user to access, use and change the contact information stored within the user collections associated with or owned by that user, as well as to change or specify the manner in which contact information within that user's contact collection is to be shared with the firm collection. Likewise, firm database access routines 31*b* communicate with the firm collection database 24*b* via a communication interface 36*b* (which may be the same interface as the communication interface 36*a* if desired) to allow users to access and use, and in some cases, change, the contact information stored within the firm collection. The firm database access routines 31*b* may include, for example, mass mailing applications, searching applications, etc.

During operation of the relationship management system, based on preferences selected by the users, changes made to contact information within the contact files of the user collections within the user collection database 24*a* may be sent to and reflected within the firm collection for that contact. In the described embodiment, to provide this functionality, the user collection database 24*a* may utilize functionality within the database engine to send that information to the firm collection database 24*b* for that contact. The firm collection database 24*b* may then automatically make the specified change to the firm collection, may provide a message to a firm administrator or gate keeper as to the nature of the change and request approval of the change before committing the change to the contact file within the firm collection, or may make the change to the firm collection and notify the firm administrator or gatekeeper of the change to review the change made. To provide this functionality, the firm collection database 24*b* may send messages directly to the firm administration applications 35 via the communication interface 36*c* (which may be the same interface as the interfaces 36*a* and 36*b*). In turn, the administration routines 35 may provide messages and other information to the firm administrator via one of the user interfaces 12.

Similarly, changes made to contact information within the contact files of the firm collection within the firm collection database 24*b* may be sent to and reflected within the user collections for that contact. In this instance, the firm collection database 24*b* may send that information to the user collection database 24*a* for that contact. The user collection database 24*a* may then automatically make the specified change to the user collections, may provide a message to a firm administrator or gate keeper as to the nature of the change and request approval of the change before making the change to the contact file within the user collection, or may make the change to the user collection and notify the firm administrator or gatekeeper of the change. To provide this functionality, the user collection database 24*a* may send messages directly to the firm administration applications 35 via the communication interface 36*c*.

Figure 3:
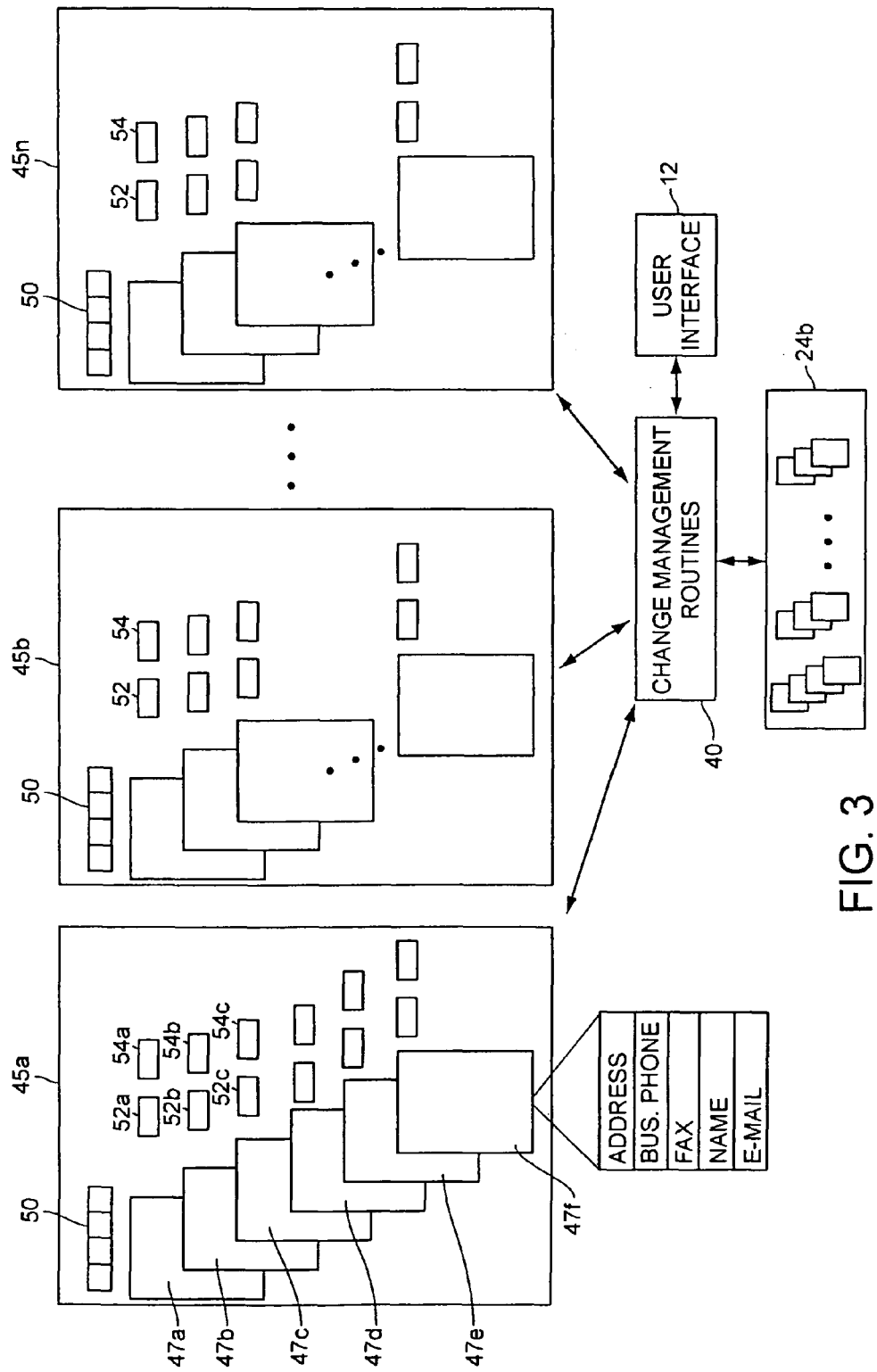
FIG. 3 is a further data flow diagram illustrating data flow between user contact collections and a firm contact collection within the relationship management system of FIG. 1.

Referring now to FIG. 3, a set of N user collections 45*a*, 45*b*, . . . , 45*n* is illustrated as being stored in the user collection database 24*a*. Each of the user collections 45*a*, 45*b*, . . . , 45*n* includes one or more contact files 47 (illustrated in user collection 45*a* as files 47*a*-47*f*). Each of the contact files 47 has different contact fields storing the different contact information for that contact file including, for example, addresses, phone and fax numbers, etc. In FIG. 3, the contact file 47*f* is expanded to illustrate some of the contact fields associated therewith. It will be understood that each of the different user collections 45 (which are typically owned by or associated with different users) includes any number of contact files 47 and that each contact file 47 may have the same or different contact fields therein. Likewise, different contact files within the different user collections 45*a*-45*n* may be associated with the same contact, such as a person, corporation or other entity, and may store the same or in some cases different information about that contact depending on the manner in which the different users who own the user collections have decided to share information.

As illustrated in FIG. 3, each user collection includes a global change management default setting 50, and each contact file within a user collection includes a couple of specific change management fields 52 and 54 (illustrated as 52*a* and 54*a* for the contact file 47*a*, etc.) The specific change management fields 52 and 54 specify, on a contact by contact basis, what information within the contact file is to be shared with the firm collection and how changes which are made to the associated contact within the firm collection are to be handled or reflected within the contact file for that user collection. In one embodiment, the field 52 may be a visibility flag having one or more bits for each field within the contact file specifying whether that field is to be made visible to the firm collection. If the bit or flag for a specific field is set to be "invisible," then the information within that field will not be sent to or reflected within the firm contact file for this particular contact owed by this particular user. In this manner, users may keep certain types of information, such a home phone numbers, personal e-mail addresses, or any other desired information, private or hidden from other users of the relationship management system and yet have access to that information within their own contact file. Likewise, in one embodiment, no changes will be made to these fields based on changes made to the corresponding fields within the firm contact file.

On the other hand, if the visibility bit or flag for a particular contact information field of a contact file is set to be "visible," then the information within that field is shared with the contact file for the same contact within the firm collection. As a result, when a user makes changes to the information within this visible field, such as adding information, changing information, etc., the new or changed information is sent to the firm collection for incorporation, if appropriate, into the firm contact file for this contact as stored in the firm collection database 24b. However, this change may or may not actually be made to the appropriate firm contact file depending on the type or nature of filtering being performed by the firm administrator who is overseeing or administrating the firm collection (or appropriate portion thereof).

The change management field 54 for any particular contact file within the user collections 45 may be a flag or other indication that enables the user to specify the manner in which changes made to the firm contact file for the associated contact are to be treated in the user's collection. While the change management field 54 is illustrated as single flag or value associated with each contact file, if desired, a single change management field 54 may be provided to control the manner in which changes are to be handled for all of the contacts within a user collection, or a separate change management flag or field 54 may be associated with each field of information or any logical group of fields of information within each contact file to enable a user to specify how changes to a corresponding contact file within the firm collection database 24b are to be handled on a more granular basis.

In any event, the change management field or flag 54 may specify that changes to the contact file within the firm collection be handled in one of many different ways. For example, the flag 54 may specify that a change to a contact file within the firm collection automatically causes that same change to be reflected in the user contact file for that contact (an automatic change with no reporting), that the change be automatically made to the contact file within the user collection and that a message be sent to the user or owner of that file indicating that a change has been made and, if desired, the nature of that change (automatic change with reporting) or that the change not be automatically made to the contact file within the user collection but that a message be sent to the user or owner of the file indicating that a change has been made to the contact file within the firm collection and the nature of that change (reporting). If desired, such a reporting message may enable a user to opt to have the change made or to opt out of having the change made with a simple reply message. Of course, other manners of dealing with changes may also be used within the relationship management system and it will be understood that appropriate messaging and changing software is incorporated into the suite of change management routines 40 and the administration routines 35 to perform these functions.

If desired, the generic flag 50 may specify the setting of the fields 52 and 54 for each contact file within a user collection when the contact file is created. Thus, the fields 52 and 54 for a contact file (such as the file 47) may be set as specified by the flag 50 when the file 47 is created. However, the user who owns the collection 45a may change the settings of the fields 52 and 54 for the contact file 47 as desired.

Figure 4:
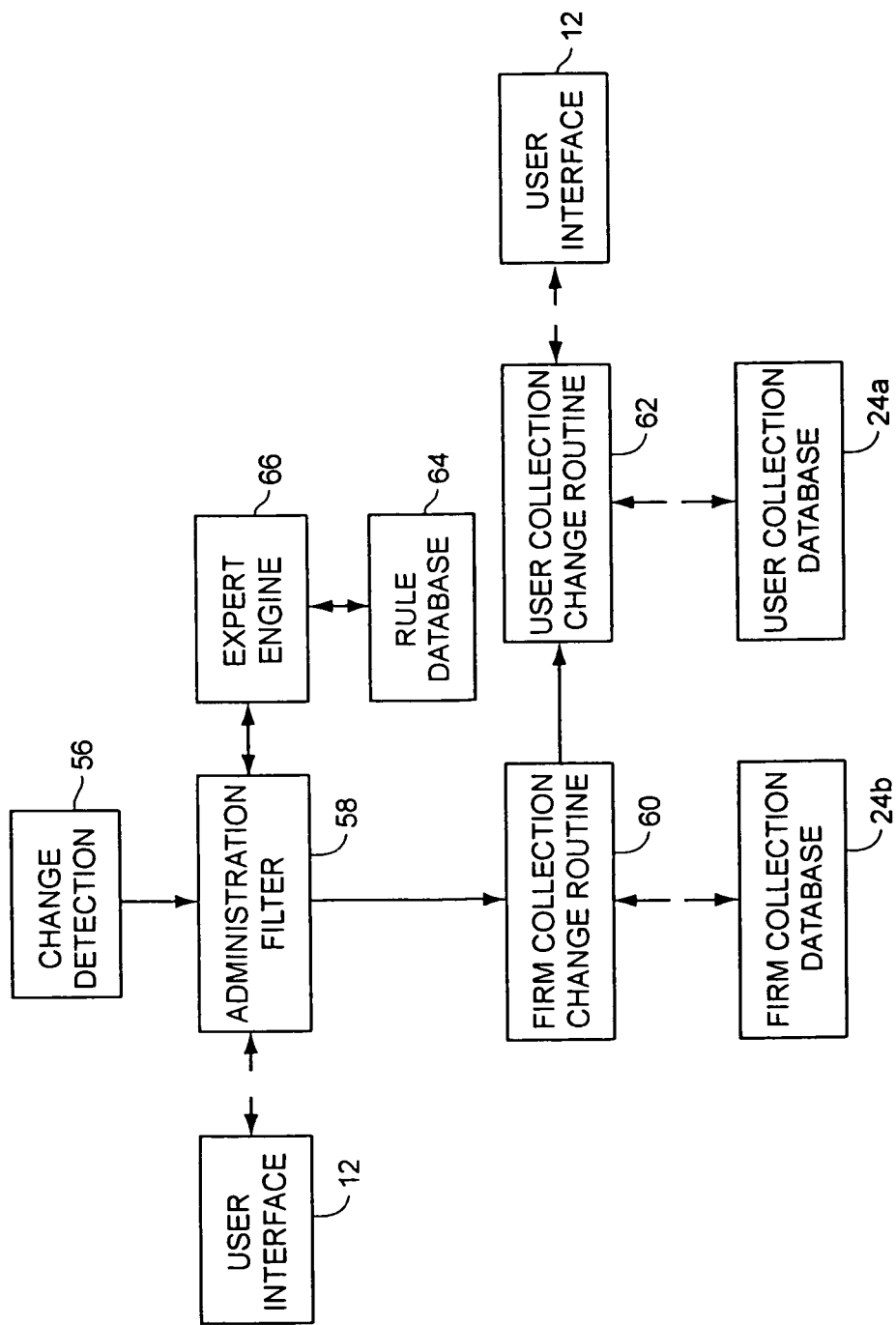
FIG. 4 is a block diagram of a set of communicatively interconnected change management routines that operate to perform change management within the relationship management system of FIG. 1.

Referring now to FIG. 4, the change management routines 40 may include a change detection application, routine or subroutine 56 which detects changes made to the contact files within the user collections 45a-45n (of FIG. 3). Upon detecting a change, the routine 56 determines if the visibility flag 52 for the contact information field to which the change was made within the user collection is set to be visible and, thus, is to be shared with the firm collection. If not, the change is not provided to the firm collection. However, if the visibility flag 52 is set to be visible, the routine 56 provides the change to an administration or oversight application, routine or subroutine (called an administration filter 58). The administration filter 58 may provide an appropriate level of processing and filtering on the change, which may include sending a message to the firm collection administrator (via one of the user interfaces 12) to have the administrator approve of the change to the contact file within the firm collection, detecting obvious errors with the change, detecting if the change is suspect in some other manner, etc. In some cases, and possibly based on input from the firm collection administrator, the administration filter 58 may provide the change, or a variation of the change, to a firm change application, routine or subroutine 60 which makes the change to the appropriate contact file within the firm collection database 24b. Of course, the change routine 60 may use the contact ID table to relate the changes made in a user collection to a contact within the firm collection or may use any other desired method of relating contacts within the user collections to a contact within the firm collection.

In any event, the same change may also be provided to a user collection change routine 62 which provides the change to one or more of the contact files for that contact within the user collections 45a-45n. The user collection change routine 62 may make or not make the change to each user collection based on, for example, whether a particular user has made the field of the contact file to which the change is to be made visible to the firm collection via the visibility flag 52. When a user collection has a contact file for that contact which has a visibility flag set to be. "invisible" for the field of contact information to which the change was made, the user collection change routine 62 may discard or not make the change to that field of information. However, the user collection change routine 62 may send a message to the appropriate user which is accessible via one of the user interfaces 12, to inform the user of the change. On the other hand, when a user collection has a contact file for that contact which has a visibility flag set to be "visible" for the field of contact information to which the change was made, the user collection change routine 62 will use the flag 54 to determine what to do with the change. If the flag 54 is set to automatic change, the user collection change routine 62 changes that contact file for that user collection automatically. If, on the other hand, the flag 54 for that contact file is set to notify the user but not make the change unless the user opts to accept the change, the routine 62 sends a message indicating the change to the user which the user may view via one of the user interfaces 12 and allows the user to respond with an indication to accept or reject the change. If the user responds by accepting the change, the routine 62 makes the change to the appropriate field of the contact file within the user collection for that user. If the user responds by rejecting the change, the change is not made. If the user does not respond, the routine 62 may send periodic reminders, may discard the change after a predetermined time, etc. If, on the other hand, the flag 54 is set to change and report (or notify), the routine 62 changes the appropriate field of the contact file within the user collection and sends a message to the user who owns the user collection that the change was made and the nature of the change. If desired, this message may allow a user to reverse the change with a response.

The administration filter 58 may use any desired technique(s) to provide some degree of integrity to the changes being made to the contact information within the firm collection database 24b. In one embodiment, the administration filter 58 may include and execute one or more subroutines that check each change for obvious or apparent errors. For example, these subroutines may determine if an appropriate e-mail address has been placed in the e-mail address field and one that, for example, did not include an "@" symbol or one of, for example, a ".com", ".gov", ".org", etc. suffix would be rejected as obviously incorrect. The routine may also determine if there is a consistent or known match between any or all of the city, state, zip code and country fields of a street address, determine if a phone number has the correct number of digits, a valid area code, etc. Of course, these subroutines may determine or look for any other obvious errors within the change that are inconsistent or suspect within the context of the field in which this information is input or within the context of information within other fields for that contact.

Still further, the administration filter 58 may include a rule database 64 that stores one or more sets of administrator changeable rules which specify the manner in which changes are to be analyzed and effected. The rule database 64 may be used by an expert engine 66 of any desired type or nature to determine that certain changes are more suspect or more in need of review based on other settings or factors, all of which may be specified by one or more firm administrators who create the rule database 64. For example, a firm administrator may specify that all changes to a certain subset of firm contacts (such as to important firm clients, anyone with a certain title, etc.) be reviewed by the administrator before being changed. Likewise, all changes made by a particular user may be flagged as being suspect based on known habits of that user to be less careful with the changes he or she makes in the user collections owned by that user, based on the length of time that the user has been with the firm, etc.

In any case, if a change passes as appropriate and is not otherwise suspect, the administration filter 58 may make the change automatically to the related contact file within the firm collection without notifying the administrator, may make the change and notify the administrator of the change and the nature of the change (thereby giving the administrator the opportunity to review the change) or may simply notify the administrator of the change and allow the administrator to review the change and opt to accept or reject the change to the firm collection via messaging on one of the user interfaces 12. Of course, these settings may be different for different types of detected errors or other properties of the change and may be specified by the rule database 64. Similarly, if an obvious or suspected error is detected, or the change is flagged by the expert application 66 for some other reason, the change may be provided to the administrator for review and for acceptance or rejection. As will be understood, the operation of the administration filter 58 and the types and numbers of messages that that routine sends to the administrator is dependent on the configuration of the rule database 64 which may be determined by the firm administrator. Thus, the firm administrator may configure the rule database 64 to pass all changes, to notify the administrator of some or all changes so that the administrator has the opportunity to accept or reject each change to the firm collection, to make changes to certain contacts and allow the administrator to review changes to other contacts, etc. Of course, these settings depend on the type, size and nature of the organization, the number of administrators that may be present within the organization, the uses to which the relational database is put, etc.

A more detailed description of one embodiment of the administration routine 35 and administration filter 58 will now be described. First of all, it will be understood that the administration routine 35 may be initially used to create relationship management tables within the database 16 to thereby organize the data therein in any desired or useful manner. In one embodiment, the tables or contacts, collections, etc. within the database 24 may be created as objects within an object oriented programming environment. In any event, one of the user interfaces 12 may store and execute a system administrator application or program that installs or sets up the tables and fields within the database 24 for the collections, contacts and contact information, as well as any other desired tables and fields used in any manner by the relationship management system. Once the database 24 is set up or created, each of the routines 31 and 35 can access the appropriate tables and fields in the database 24 as described above to add, delete, view and use the collections, contacts and contact information stored in the database 24. If desired, a list of contacts is stored in one table in the database 24 along with a unique identifier or contact ID for each contact, while the list of collections and a unique folder ID for each collection is stored in a separate table. Still further, a table may store unique user IDs for each user of the relationship management system. Different types of contact information is stored in still different tables and, generally speaking, a different table exists for each different type or category of contact information, such as addresses, phone numbers, etc. Of course, each contact information table may have different attributes for each piece or type of contact information. Thus, a table that stores street or post office address information may have different fields or attributes including, for example, a number of fields for a street or post office designation, a field for a city designation, a field for a state designation, a field for a zip code designation, etc., while a table that stores electronic address information may have a field for an e-mail address and a field for a web site address.

Also, generally speaking, when a user wants to add a new contact to the database 24, the database access routine 31 may search the contact table for a collection owned by that user or by the firm collection to determine if a contact having that name or a similar name already exists within the database 24. A set of similar contacts may be displayed to the user and the user may be asked if any of the already existing contacts is the same contact as the new contact being entered. If not, then the new contact is stored in the contact table and is given a unique contact ID and, thereafter, contact information may be stored for this new contact in the contact information tables by referencing the contact ID associated with this new contact. Similarly, the routine 35 or one of the routines 40 may determine if the firm collection potentially includes a contact file for that contact and, if not, may add that contact to the firm collection (assuming that some of the information for that contact is visible to the firm collection). In this process, the routines 40 and 35 may send one or more messages to the firm administrator(s) asking if the new contact entered by the user is the same as one or more other similar contacts within the firm collection to prevent two different contact files from being created for the same contact within the firm collection. In any case, the contact IDs for the firm collection and the user collection for a particular contact are linked in, for example, an ID linking table, such as that discussed above.

During the change management process, which is initiated by additions, changes or deletions to the database 24, the administration filter 58 may process the changes and may apply one or more rules as stored within the rule database 64 to the changes to determine one or more event actions to be taken. An event action may be, for example, to make the change to the firm collection, to provide the change to one or more data administrators for review, notification, acceptance, etc., to send a follow-up message to the user making the change, addition or deletion, etc. Upon determining an event action, the administration routine 58 may create a ticket and provide that ticket via an inbox to the appropriate administrator for processing.

If desired, more than one data administrator may specify rules to be applied to the change and, thus, more than one set of rules may be used to analyze any particular change. Generally speaking, the change management rules within the rule database 64 provide a level of control over additions, modifications, or deletions made to firm contacts. The imposed rules dictate how a captured change will be evaluated and processed prior to entering a review change process in a data quality inbox of an administrator. Of course, different rule sets may be selected or used based on different properties of the changes, such as the contact on which the change is made (which may be, for example, a highly managed contact, a moderately managed contact, an unmanaged contact, etc. having different levels of management and review), the user making the change, the type of change being made, etc.

Thus, for example, when a change is detected, the change may be categorized as one of an add, edit, delete, format change, and suspect change based on processing performed on the change. The add, edit and delete classifications are self-explanatory. A format change classification signifies that the data has been altered, but the actual value has not. Generally speaking, a format change may be detected by comparison logic that normalizes both the changed and the unchanged values before being compared. In one example, the comparison logic may remove all punctuation, remove all extra spaces, convert to upper case for case insensitive comparisons and expand abbreviations (in addresses for example). If, after this normalization process, the before and after values are equal, the change is simply a format change. A suspect change indicates incomplete data or the misuse of a field and is identified when data items that have associated validation rules are evaluated and the change made to the data does not pass the validation test(s). Examples of this type of change include an address with only a city value, an address that does not pass state/country validation, a phone number with less than seven digits, etc. Of course many other types of suspect changes may be detected.

After being categorized with respect to a change type, rule sets as stored in the rule database 64 may be used to analyze a change and determine one or more event actions for that change. Rule sets may include rules that function on one or a combination of change types, contact types, user or user types, external system changes, "values" for specific actions, etc. Change types are described above. Contact types define the type of contact to which the change is made and may include, for example, experts, clients, users, employees, professors, corporations, or any other designation defining a type of contact. Processing on contact types enables consistent processing behavior for contacts of a specific classification or profile. The user type defines properties of particular users of the system who are making the change and may specify some generic property of the user, such as the access the user has, the role the user performs in the firm, the age, tenure, etc. of the user or any other property of the user. Processing on user types enables special behavior based on who is making the change, which allows an administrator to more closely monitor changes made by very inexperienced, disgruntled or notoriously "bad" users. The external system type may define the type or nature of an external system from which the change is made, such as a different database (like Outlook or a PDA). With this type, rule collections for an external system may be created to manage changes made to, for example, the employee contact type. The external system type enables special processing behavior based on the specific external system that owns the data and provides the capability for an administrator to provide a submission process for data that is maintained in another system, such a Outlook, etc. Rules or rule sets based on this type help assure that ambiguous changes made in other systems are recognized and analyzed to prevent or detect ambiguities or other problems arising from the manner in which the external system stores or recognizes the data.

Because rule sets can be defined in multiple contexts, multiple rule sets may be applicable for any given change event. For example, a contact could have five different contact type classifications, with each contact type having a different rule set applied thereto. Still further, if more than one rule set is applicable for a given change event, then it is desirable to provide an ordering of the rule sets to ascertain which rule set to use to determine the event action and the processing order of the rule sets to locate the most restrictive event action setting. If more than one rule set applies for a given change event, then all the rule sets may be analyzed to locate the rule set with the most restrictive event action value. Likewise, if more than one rule set is found to have the most restrictive event action, then the highest-ranking rule set may be used to process the event change.

Generally speaking, a rule collection is a set or a compilation of rules that apply to various fields of contact files. For example, when an administrator is creating a new rule collection, the Accept rule may be applied to all fields within the rule collection by default. The administrator can then name the rule collection and apply different rules to different fields for the contact. At this time, the rule collection could be applied to a new rule set.

As will be understood, the primary role of the rules engine or expert engine 66 is to respond to detected changes and to provide the appropriate event action for a given change event. The rules engine 66 evaluates a change event by first determining the rule sets that are applicable for a particular change event, based on certain factors such as contact type, user who made the change, etc. Then the rule engine 66 orders the rule sets in the case in which more than one rule set is applicable. The engine 66 may then iterate through the applicable rule sets to locate the most restrictive action and, if more than one rule set is applicable, select a primary rule set by finding the highest ranking rule set with the most restrictive action value. The primary rule set is used to determine the owner (e.g., the specific administrator if more than one administrator oversees changes) and the action value of the change event. Secondary rule sets are used to determine the secondary owners or administrators for notification purposes. The rules engine 66 may then determine the event action value for both the primary and secondary rule sets.

The rules engine 66 also provides an interface to be called from a windows client administrator. The configuration and management of the rule sets, rule collections and rules are preferably performed in the administration routines 35. When changes are made to any of the rule components, the rules engine 66 may be notified in order for it to properly update its data cache.

In response to a change, an event action, as determined by the rules engine 66 based on the primary and possibly secondary rule sets, occurs to process the change, with the event action being, for example, one of the accept, review, submit and notify (follow-up) actions. These event actions may be represented in a data quality inbox for an administrator as a status associated with a ticket item. Generally speaking, the accept action indicates that the data owner (or administrator in this case) does not want to monitor the change made and the system processes the change using normal business rules logic. Because sites may get overwhelmed with reviewing tickets, the accept event action may be associated by default with a majority of the change events in the system. The review action indicates that the data owner (e.g., the administrator) wants to review or monitor the change. When the review action is used, the system processes the change using normal business rules logic and the administrator is notified of the change via the data quality inbox. The submit action indicates that the data owner (e.g., administrator) wants to approve of the change. In response to a submit action, the system does not process the change until the administrator specifically approves of it. Preferably, the administrator is notified of the submit requests via a data quality inbox.

The notify (follow-up) action is an additional setting that applies to action values of review or submit, whereby the system is instructed to notify the administrator in the special circumstance where the rule set loses out to another rule set. Situations in which this would occur may include when a higher ranking rule set applies and has the same action value for the change event, a lower ranking rule set applies and has a more restrictive action value for the change event., the rule set is associated to a data type and the data item that has changed is owned by an external system with the external system rules ranking higher than contact type rules, etc. The notify action provides a means by which a rule set owner can always be notified of change events even though the rule set may not be the primary rule set selected for the change event.

Referring now to FIG. 5, an example screen display that may be provided to a data administrator via one of the user interfaces 12 is used to specify follow-up text for the administrator or a user to suggest some additional processing that should take place as a direct result of the processing of a specific change event. This additional processing may ensure the firm listing is updated in accordance to firm policies and procedures. As illustrated in FIG. 5, follow up text, which may be provided to the data administrator via text messages within a change action ticket, may be specified according to any combination of change category (such as an change type, contact type, user request, etc.), an item, which may be a change to a specific field, such as an address field, a change to a particular type of contact, such as a client, and an action type, such as an add, delete, format, etc. action type, etc. The follow-up text may be specified in a text field and this follow-up text or message may be given a priority to enable the rules engine 66 to accord a priority to this follow-up text message when other rules apply as well.

Figure 6:
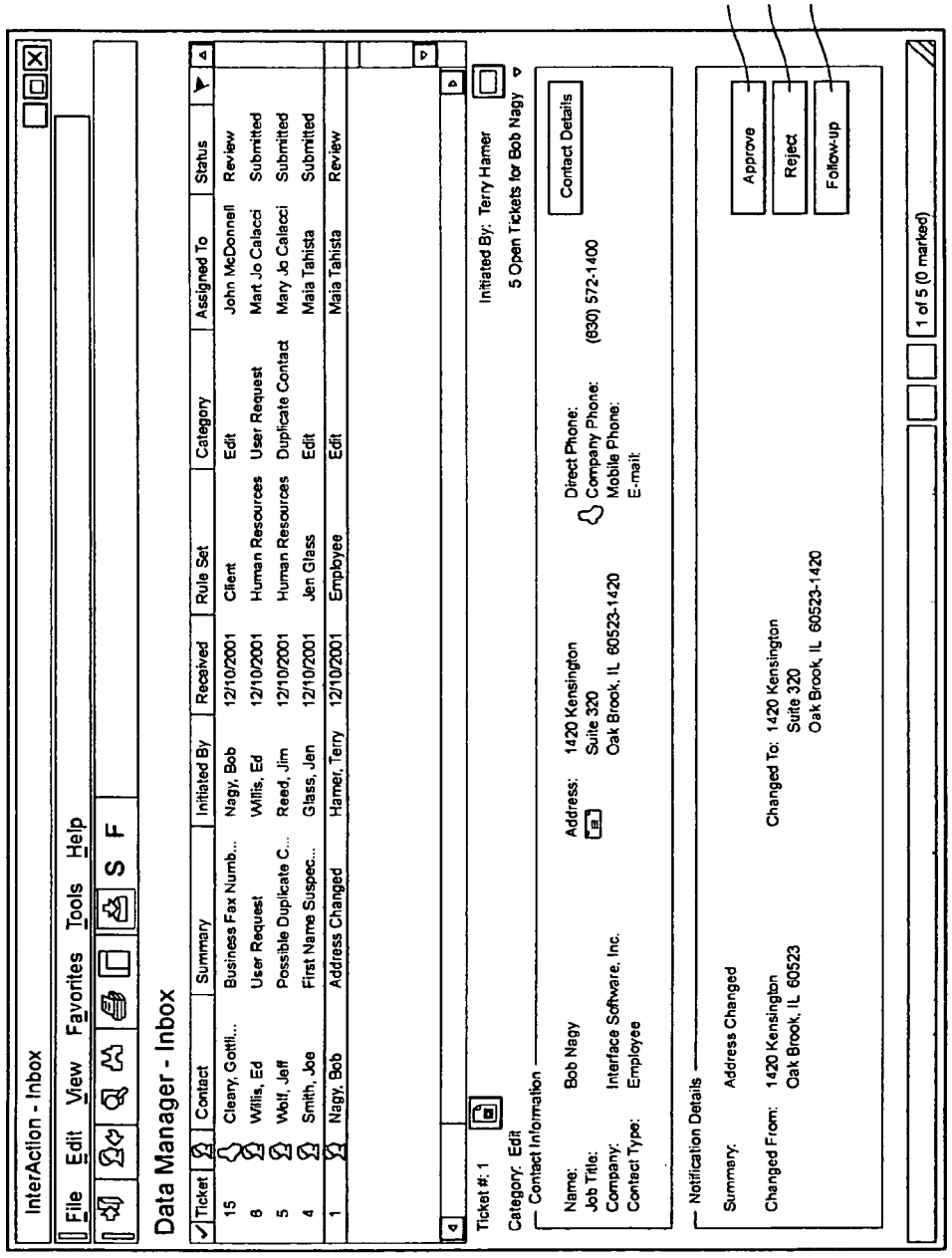
FIG. 6 is a second screen display illustrating an example display screen that may be provided to a firm administrator by one of the routines of FIG. 4 for use in managing the changes made to the databases of FIGS. 2, 2A, 2B, 2C, and 3.

FIG. 6 illustrates an example screen display of a data administrator inbox that may be provided to an administrator to provide the administrator with the set of tickets generated by or as a result of change actions which have occurred. As illustrated in FIG. 6, a first screen section 70 provides a summary of the pending tickets, with this summary having a ticket number, a contact to which the change occurred, a summary of the change or a brief description of the change, a user who made the change, the date the change was detected, the rule set that was applied to the change, a category of the change, an administer to whom the change belongs and a status of the event action or ticket (e.g., what action the administrator has taken, if any). Of course, other information could be supplied in addition or instead.

A second, detailed information section 72 provides more details pertaining to a highlighted one of the tickets. In this example, ticket number one indicates that Terry Hamer made an edit to the address field of the contact Bob Nagy. The administrator can accept or reject the change by selecting the approve or reject buttons 74 and 76 or can get follow-up instructions from the follow-up text by selecting the follow-up button 78. If the administrator accepts the change, the change is made to the firm contact within the firm collection and may also be reflected back in other user collections besides the user collection of Terry Hamer wherein this change was made in the first place. The purpose of the screen of FIG. 6 is to view tickets which are generated by the rule engine and submitted to the data manager inbox for completion.

As will be understood, a predetermined rule set criteria associated with a particular contact (which may be different if the contact is highly managed, moderately managed and unmanaged) is applied when a user adds, modifies, or deletes information associated to a contact and a ticket #, category, and status is then assigned to the change. This ticket is then sent to the administrator. The inbox of FIG. 6 is, essentially, a listing of all tickets that have been routed through the system to the administrator for review and/or completion.

When displayed in the inbox and, in particular, the summary section 70, the tickets may be sorted in any desired or applicable manner, such as by status, date, and contact, order of importance, ticket number, etc. The ranking of status may be as submitted, reviewed, outdated, notify and completed. Generally speaking, the purpose of the ticket groupings is to identify the most critical tickets, e.g., the tickets that are awaiting acceptance or that have been in the system for a particular period of time. Of course, the administrator can sort the columns individually, in which case the original sort order will no longer display for the current session. If more than a particular or preset number of tickets that require completion are to be displayed, an alert may be presented to indicate that the inbox needs to be filtered.

Figure 7:
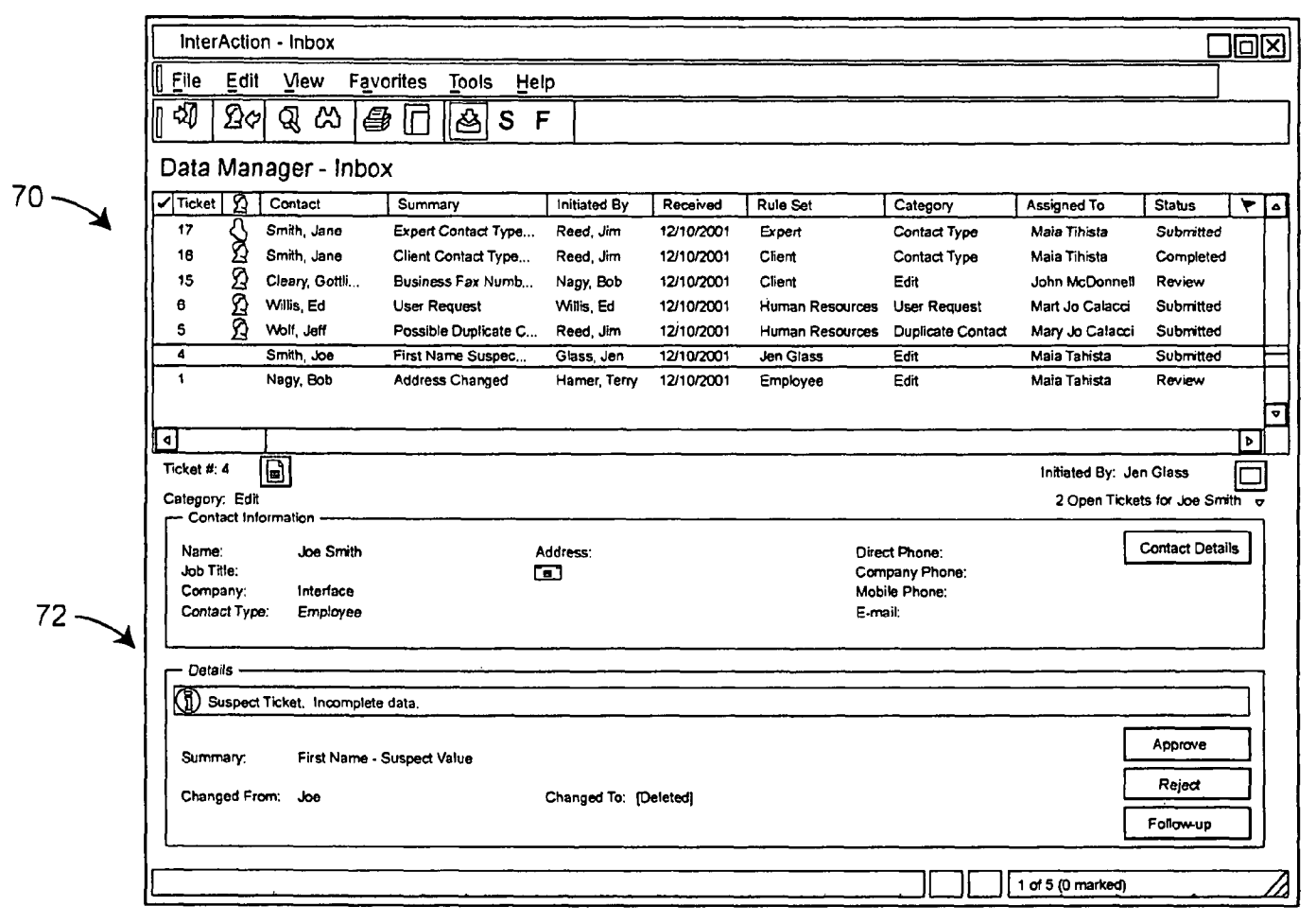

Referring now to FIG. 7, an example screen display illustrating a ticket (number 4) that has been identified to have a suspect change type is illustrated. Here, the field 72 illustrates that the first name of the contact was completely deleted, which is suspect. Generally speaking, a suspect change indicates to the data steward or administrator that the monitored contact information contains incomplete data or that a field has been misused. For example, a user may have entered an e-mail address in the phone number field. Typically, the administration filter 58 (FIG. 4) will perform validation checks of information on a field-by-field basis. If information contained in a field does not pass validation, then the filter 58 generates a ticket with the suspect change type.

If desired, an alert indicating the suspect description may be displayed and a summary for a suspect edit may be provided as a combination of the field name plus the suspect value change type name. For example, if a ticket was generated because a contact's first name was deleted, the summary would be "First Name—Suspect Value".

A suspect description may be displayed in an alert box, for example, above the summary line. As illustrated in FIG. 7, the suspect description may contain a brief explanation why the associated ticket line item is a suspect change. For instance, if only six out of the seven numbers associated with a phone number were entered, the summary text may be "Phone Number—Suspect Value" and the description in the alert box would indicate "incomplete data." When the status of the ticket becomes "Completed," the alert box may contain the "Completed" ticket text and the description of the suspect change may be appended to the summary text in the ticket review or summary section 70. For example, if the first name of a contact was deleted, the description in the alert box when the ticket is open might be "Incomplete Data: First Name [Deleted]" and the summary text might be "First Name—Suspect Value." However, once the ticket is completed, the alert box may state "Completed ticket. Maia Tihista approved the ticket on Dec. 10, 2001." The summary text may also now contain the description of the suspect change, which in this case would be "First Name—Suspect Value, Incomplete Data: First Name [Deleted]."

The following is an example list of the suspect summary text along with the associated suspect descriptions that may be displayed in the alert box above the summary label, and when the ticket is completed, may be appended to the summary text below the alert box:

| Suspect Summary Text | Description Appended to Summary Text |
|---|---|
| First Name - Suspect Value | No First Name Value |
| First and Last Name - Suspect Value | The first name also changed when the last name changed. |
| Address - Suspect Value | The address is incomplete. The address contains state and country values that are considered an invalid combination. |
| Phone Number - Suspect Value | The phone number does not contain at least 7 digits. The phone number contains invalid characters. |
| E-mail Address - Suspect Value | The e-mail address may be invalid because it does not contain an '@' symbol. |

Figure 8:
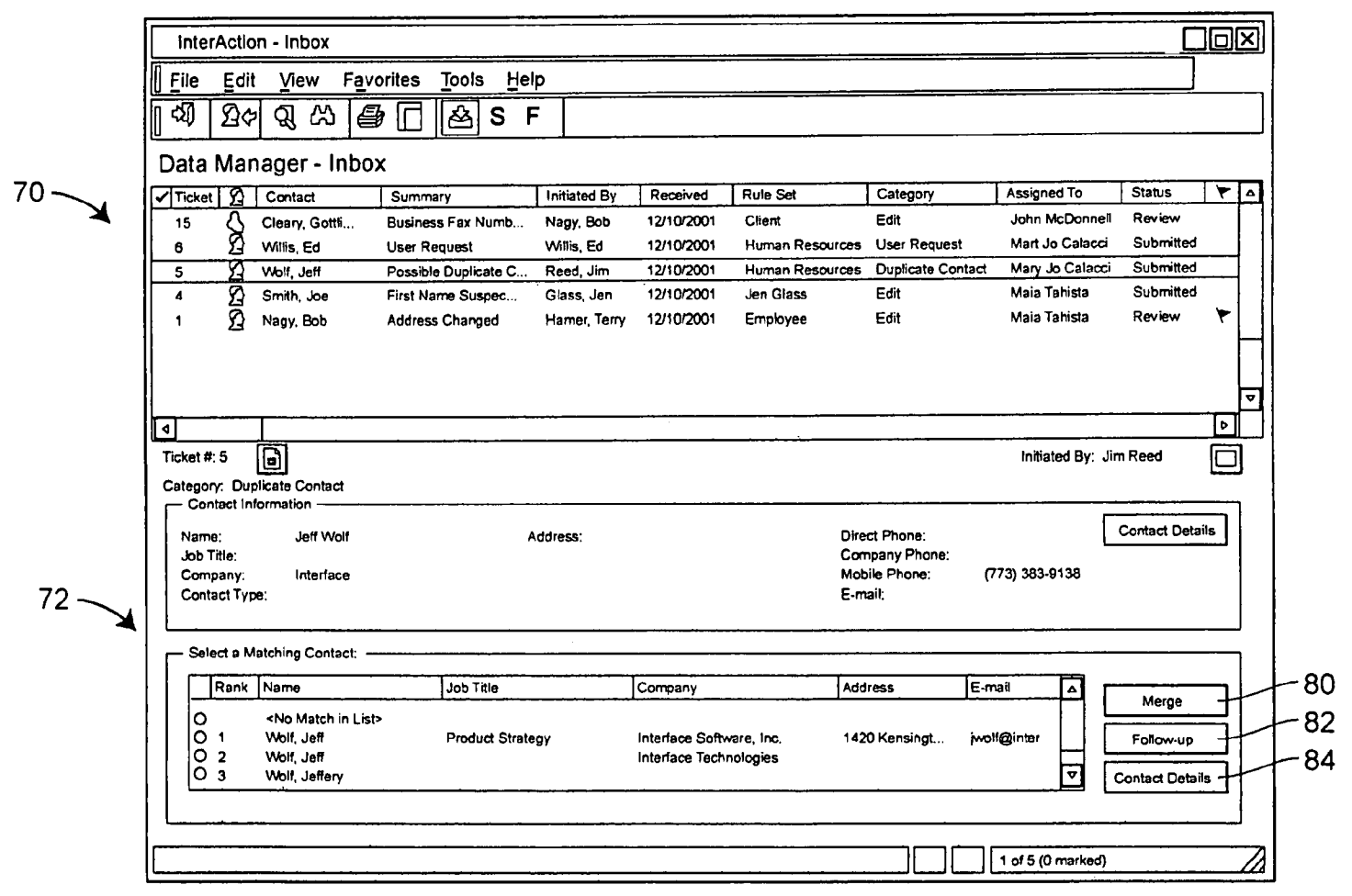

Referring now to FIG. 8, an example screen display that may be associated with a ticket which indicates that that a potential duplicate contact has been added to the database which may be detected by the administration filter 58 of FIG. 4. In this case, the detailed information section 72 provides the administrator with a list of potential contacts within the firm collection that may match or be a duplicate of the newly added contact within one of the user collections. The purpose of the processing within the filter 58 is to avoid contact duplicates and the duplicate contact categorization provided by this screen denotes the newly added contact needs to be checked against one or more existing contacts in the system. The radio buttons in the first column of the detailed information section 72 allow the data steward or administrator to select that there are no contacts in the list that match the selected contact or that the contact associated with the ticket is a duplicate of a listed one of the contacts existing in the system. When the administrator selects the "No Match in List" radio button, the Merge button 80 will change to an OK button and will become enabled. On the other hand, when one of the radio buttons associated with a contact in the list is selected, the Merge button 80 will become enabled. Upon selecting the Merge button 80, a merge operation is performed which merges the new contact with the selected, existing contact. The administrator may be called upon to select between different data for the same fields within the merged contact when the same field for the existing and new contact have different information therein. Upon merging the duplicates, the resolution displayed in the Ticket History tab of the Ticket Details window may indicate that the duplicate has been merged. Of course, the data administrator may select the Follow-up button 82 to have access to further processing steps which are suggested to be performed and may get more contact details by selecting the Contact Details button 84.

Figure 9:
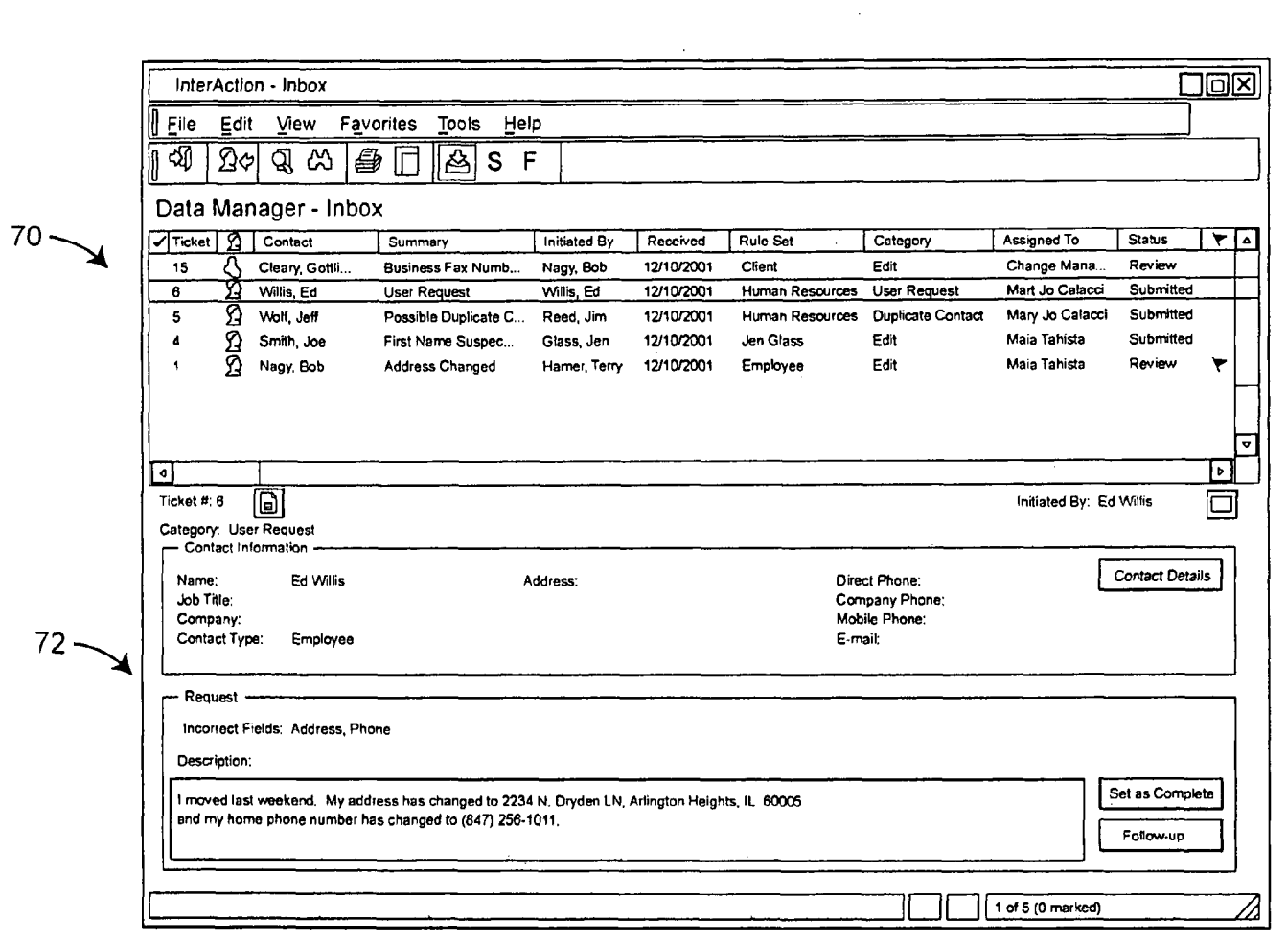

FIG. 9 illustrates an example screen display that may be presented to the administrator to provide the administrator information about a user request type change. The purpose of the user request category or change type is to indicate to the administrator that a user has entered a description of a request or notification via the correction request screen in, for example, a Web Client or Windows Client. For instance, if a company went out of business and a user was not sure what to do with that information and/or how to update the information in the system, the user could enter the information in the description area of the correction request screen and submit the request as a user request which would be detected as such and presented to the proper data administrator. The data administrator could then review the request and make the necessary modifications to complete the request.

A more detailed description of another embodiment of the user collection change routine 62 will now be described. Generally speaking, when a user makes an addition, change, or deletion to one or more contact files for that contact within one of the user collections 45a-45n, the user collection change routine 62 may or may not propagate the change to each of the other user collections 45a-45n and/or the firm collection 24b based on a set of predefined rules, and/or based upon a user response. Specifically, when a user changes data within one of the user collections 45a-45n, the user collection change routine 62 is adapted to allow an administrator to define sharing rules for when contacts that are added to a user's contact list should be automatically added to the firm collection and/or recommend that the changes be added to the firm collection based on such things as contact match, company association or similar match for a specific folder. In other words, the user collection change routine 62 will control the flag 54 to determine what to do with the change. If the user collection change routine 62 determines that the flag 54 should be set to automatically change, the user collection change routine will automatically incorporate the user change into the firm collection. If, on the other hand, the user collection change routine 62 determines that the flag 54 for that contact file should be set to notify the user of recommendations to add or not add the user contact to the firm collection, the user collection change routine 62 will prompt the user to contribute or not contribute the entered contact information to the firm collection. If the user responds by rejecting the offer to contribute the contact to the firm collection, the contact is not forwarded to, and/or integrated with, the firm collection. If, on the hand, the user responds by accepting the offer to contribute the contact to the firm collection, the change is forwarded to the change routine 60 to propagate the change made to the user collection to the corresponding contact, if any, within the firm collection.

In general, the administrator may define one of a number of sharing rules for when a contact is added to the user contact list. The sharing rules may be stored in the rule database 64 for access by the user collection change routine 62. The rule may be set such that contact information is added to the firm list automatically when contact information is added or changed within the user's contact list. Alternatively, the rule set may be set up such that when a contact's information is added or changed in the user's contact list, the contact information is kept in the user's list only and is not added to the firm list. Still further, the rule set may be administered such that when a contact's information is added or changed in the user's contact list, the user is asked to manually decide if the information should be added to the firm collection. If the user is asked to decide whether the contact should be added to the firm collection, the administrator may recommend one of a number of global rules to assist in the user's review process. For example, the user can select to recommend an action to the user for contributing the user contact to the firm collection. These recommend rules may vary widely, but in the disclosed embodiment include an ability to automatically add the user changes after a specified number of days, for example 30 days. The purpose of such a rule is to indicate that within the specified time frame, if the user does not do something with the contact information by either indicating that they want to keep the information solely within the user collection or that they want to share it with the firm collection, then the firm will automatically add the contact to the firm collection after a specified number of days.

Figure 10:
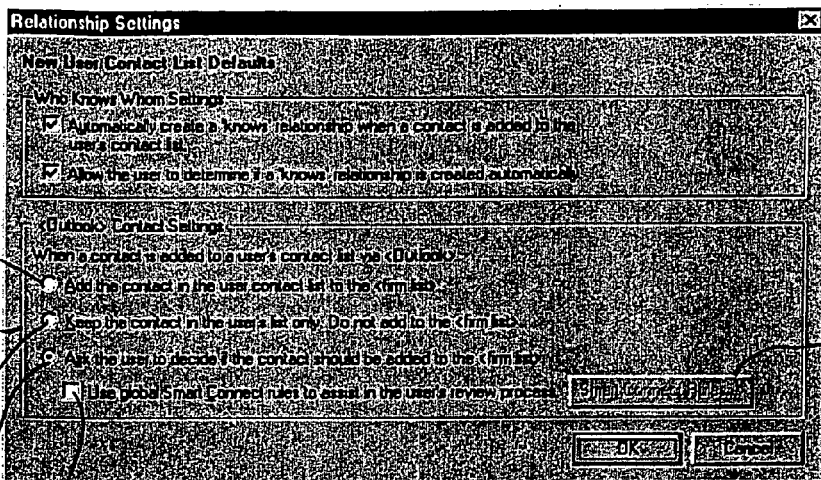
FIG. 10 is a sixth screen display illustrating an example display screen that may be provided to a firm administrator by one of the routines of FIG. 4 for use in managing the changes made to the databases of FIGS. 2, 2A, 2B, 2C, and 3.
Figure 11:
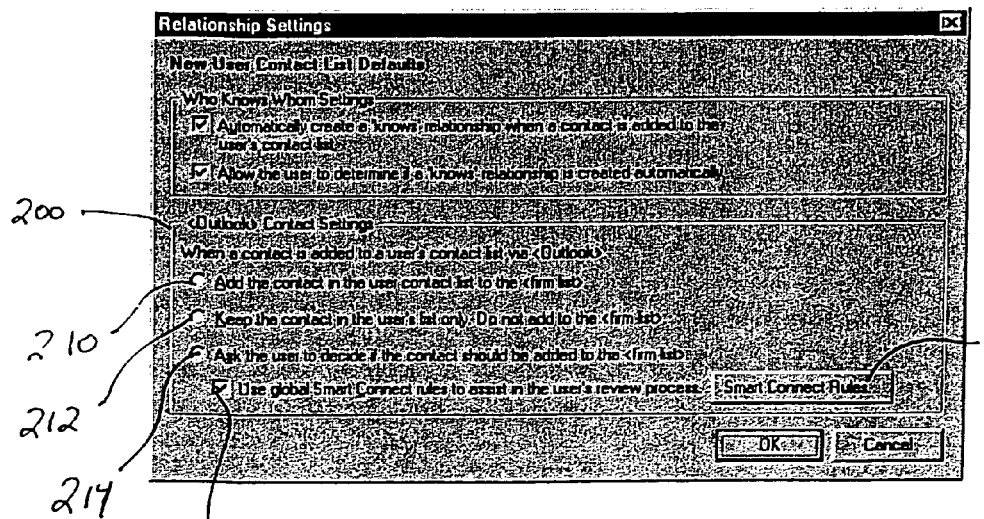
FIG. 11 is another example of the sixth screen display illustrating an example display screen that may be provided to a firm administrator by one of the routines of FIG. 4 for use in managing the changes made to the databases of FIGS. 2, 2A, 2B, 2C, and 3.

Referring now to FIG. 10, an example screen display that may be provided to the data administrator via one of the user interfaces 12 is used to specify the rules associated with the addition of a contact to a user's contact list. As illustrated in FIG. 10, a first screen section 200 provides the administrator with the ability to select a specified contact rule, which, in this example, will occur when a contact is added to a user's contact list. For instance, when a contact is added to the user contact list, the administrator has the ability via radio buttons 210, 212, and 214 to choose whether the contact will be automatically added to the firm collection, whether the contact will be kept private in the user list only, or whether the user will be asked to decide if the contact should be added to the firm collection. If the administrator selects the radio button 210, when a contact is added to the user contact list, that contact information will be automatically contributed to the firm collection. If the administrator chooses the radio button 212, when a contact is added to the user contact list, the contact information will be maintained within the user list only and will not be added to the firm collection. Finally, if the administrator chooses the radio button 214, the user will be asked to determine whether the contact should be added to the firm list. Once the administrator selects the options to allow the user to decide if the contact should be added to the firm list, the administrator may develop a number of preset rules to assist in the user's review process by selecting the check box 216 (FIG. 11) and selecting the button 218.

Figure 12:
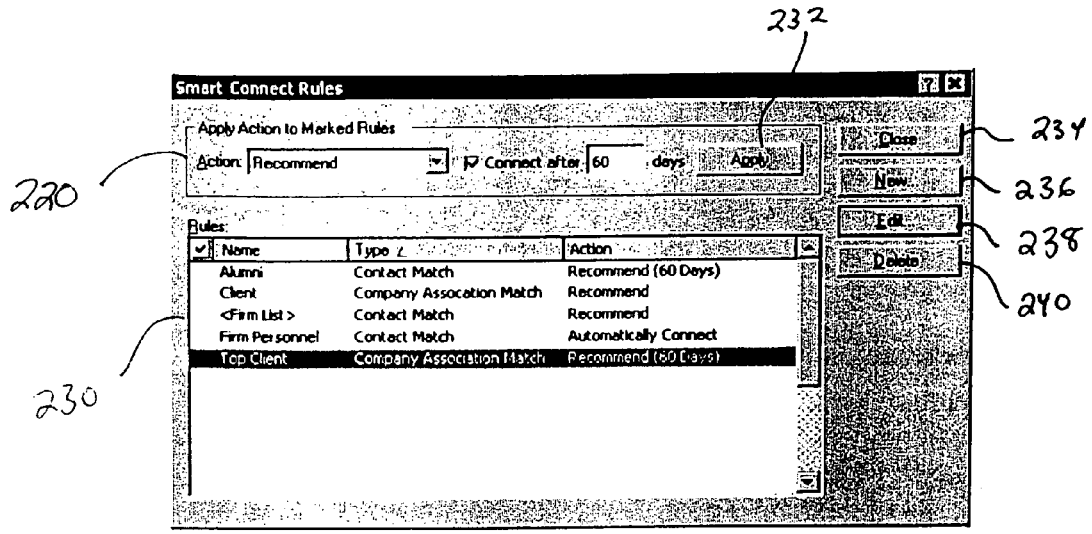
FIG. 12 is a seventh screen display illustrating an example display screen that may be provided to a firm administrator by one of the routines of FIG. 4 for use in managing the changes made to the databases of FIGS. 2, 2A, 2B, 2C, and 3.
Figure 13:
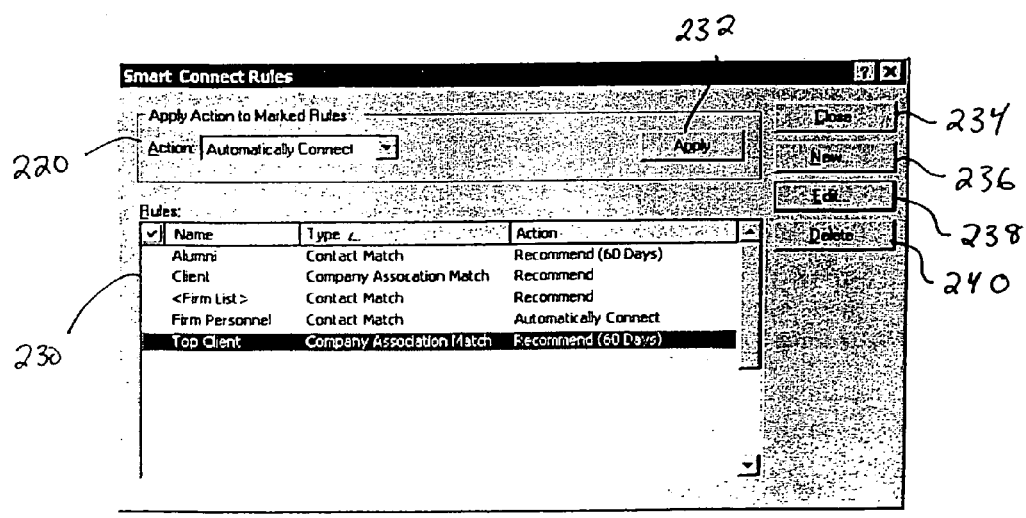
FIG. 13 is another example of the seventh screen display illustrating an example display screen that may be provided to a firm administrator by one of the routines of FIG. 4 for use in managing the changes made to the databases of FIGS. 2, 2A, 2B, 2C, and 3.

FIGS. 12 and 13 illustrate an example screen display of a data administration set up screen to assist in the administrators rule development process. As illustrated in the figures, a first screen section 220 provides a drop-down list box allowing the administrator to choose between a number of preset rule definitions, including, for example, automatically connecting the contact change to the firm list (FIG. 13) or recommending that the contact change be contributed to the firm collection (FIG. 12). As noted above, when the recommend option is selected, a "connect after <blank> days" check-box field is displayed next to the drop-down list box. If the administrator designates a time frame, and the user does not do something with the contact by either indicating that they want to keep the contact solely within the user collection or that they want to share it with the system collection, then the system will automatically add the contact to the firm collection after the designated number of days. For instance, in this example, if after 60 days the recommended contact remains in the unknown state, the contact information is automatically added to the firm collection. If, however, no time frame is designated by the administrator, the user contact information will not be automatically added to the firm collection.

A second screen section 230 provides a summary of the current administrator rules, with the summary having a name, a type, and an action (e.g., what action the administrator has recommended if any). Of course, other information could be supplied in addition to or instead of the noted fields. In the disclosed example, the name column is the default sort column and displays alphabetically in ascending or descending order. The name column contains the name of the contact type, the firm collection name, or the name of the folder upon which the rule will be processed. The type column contains either a contact match or a company association match as described below. The action column may display "Automatically Connect" and/or "Recommend". When "Recommend" is displayed, the length of the recommendation time, displayed in days, may be displayed in parentheses. For example, for the rule related to alumni, the action notes "Recommend (60 days)". If, however, the user has not utilized the connect after a predetermined number of days feature, the recommend indicator will have no time frame displayed in parentheses.

As further illustrated in FIGS. 12, 13 the screen display may provide a plurality of buttons 232, 234, 236, 238, and 240. The first button, the "Apply" button 232 will save the selected action in the first screen section 220 to the highlighted rule or rules in the second screen section 230. The "Close" button 234 will close the screen display. The "New" button 236 and the "Edit" button 238 will open a new screen display (FIGS. 14-16) and will be described in greater detail below. Choosing the "Delete" button 240 will display a delete confirmation for the selected row, allowing the administrator to delete any rules highlighted in the second screen section 230.

Figure 14:
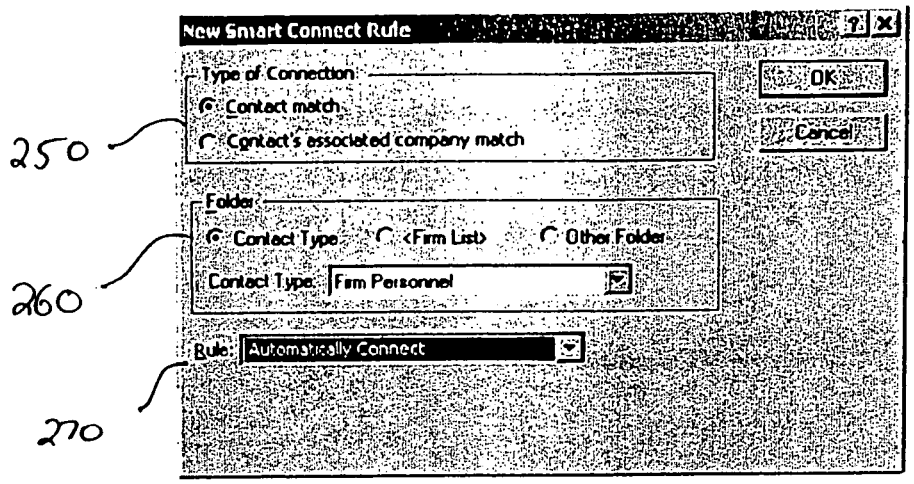
FIG. 14 is an eighth screen display illustrating an example display screen that may be provided to a firm administrator by one of the routines of FIG. 4 for use in managing the changes made to the databases of FIGS. 2, 2A, 2B, 2C, and 3.
Figure 15:
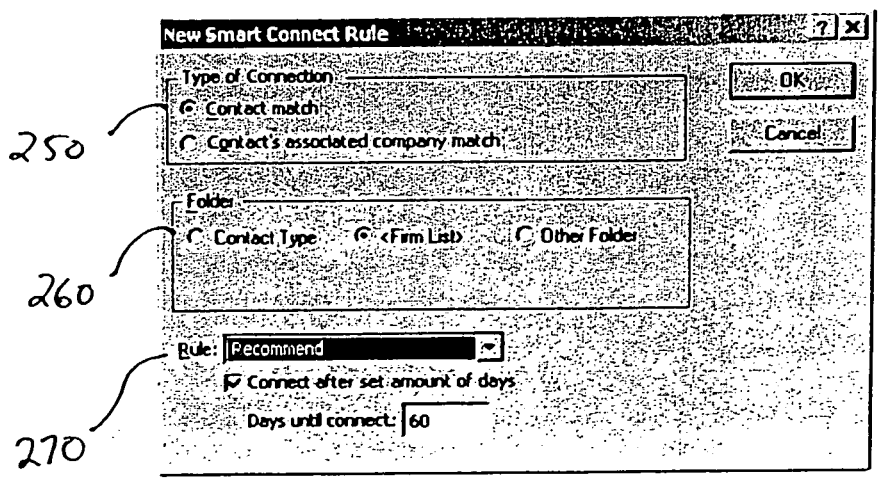
FIG. 15 is another example of the eighth screen display illustrating an example display screen that may be provided to a firm administrator by one of the routines of FIG. 4 for use in managing the changes made to the databases of FIGS. 2, 2A, 2B, 2C, and 3.
Figure 16:
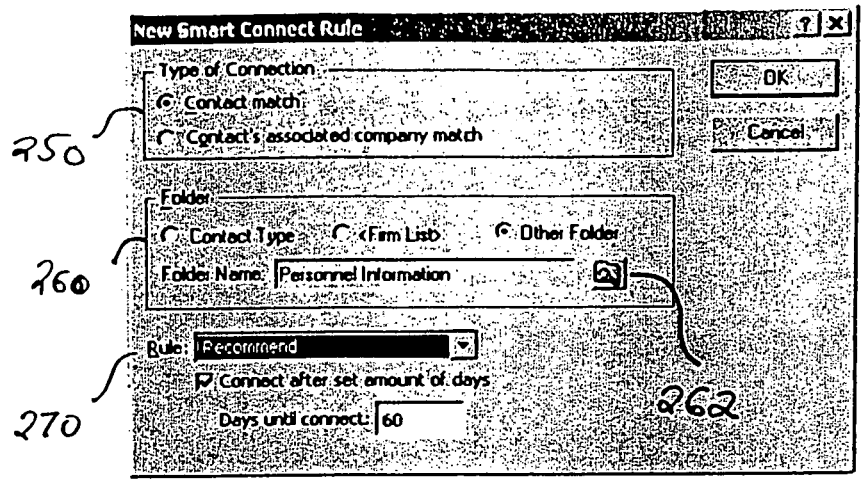
FIG. 16 is a ninth screen display illustrating an example display screen that may be provided to a firm administrator by one of the routines of FIG. 4 for use in managing the changes made to the databases of FIGS. 2, 2A, 2B, 2C, and 3.

FIGS. 14-16 illustrate an example screen display of another data administration screen that may be provided to an administrator to assist the administrator with creating a new rule or editing a rule highlighted in the second screen section 230 of FIGS. 12 and 13. As illustrated, the example screen display allows the administrator to define the rules for contact and company association matches in conjunction with a specified folder, wherein the administrator can recommend that the contact be added or automatically add the contact to the firm collection. The administrator has the ability to determine whether the user contact is a contact or company association match as well as to determine whether the user contact exists in the firm collection, is of a specific contact type, or whether it exists in a specified folder as described below.

As illustrated in FIGS. 14-16, a first screen section 250 provides a radio button selection of the type of connection having, in this example, a contact match selection and a company association match selection. As described previously, a contact match will occur when the associated contact in the user collection matches a contact contained within the firm collection or specified folder. The criteria for a "match" may vary according to the system administrator's preference, and may include, for example, a name and address match. Similarly, an associated company match will occur when the contact's associated company matches one of the companies contained within the firm collection or specified folder.

A second screen section 260 provides the administrator with the ability to specify which folder the rule will examine to determine the type of connection mentioned above. In the disclosed example, the administrator has the ability to select from a contact type, a firm collection, or another specified folder. When the administrator selects the contact type (see FIG. 14), the contact type drop-down list will enable the administrator to select a contact type from a predetermined list. (e.g., alumni, client, firm personnel, top client, etc.) In the illustrated embodiment, if a rule already exists for a particular contact type of a specific type of connection, (contact match or company association match) the drop-down list will not include that contact type as a selection option. For example, if the administrator attempts to enter a new rule wherein a rule for contact matches for type "Firm Personnel" already exists, then the drop-down list shown in FIG. 14 would not contain the "Firm Personnel" contact type. If the administrator selects the firm list (firm collection) radio button as shown in FIG. 15, the rule will attempt to match the type of connection to the firm collection. Similar to the contact type, if a rule for the firm collection of a connection type "Contact Match" already exists, when the user selects "Contact Match", the firm list radio button is unavailable as a selection to the administrator. When the administrator selects the other folder radio button in the second screen section 260, a read-only drop-down list is displayed beneath the radio button selections. The administrator may then choose from one of the other folders listed in the folder name drop-down list box. A search button 262 may also be displayed, as in this example, allowing the administrator to search for and find a specified folder as shown in FIG. 17 and as will be described below.

Continuing with FIGS. 14 and 15, a third screen section 270 allows a drop-down list box which provides the administrator to choose a rule, similar to the selection presented in the first screen section 220 of FIGS. 12 and 13. As noted previously, the drop down list box contains the prepopulated "Automatically Connect" rule and "Recommend Rule" for selection. When the user selects "Recommend," the connect after a set amount of days checkbox will display along with the editable "Days Until Connect" field in which the administrator may enter the default number of days (see FIG. 15). As noted previously, the automatically connect rule will automatically add the user contact to the appropriate folder (see FIG. 14). Of course, it will be appreciated that any number of rule combinations may be presented to the administrator in addition to or instead of those presented above.

Figure 17:
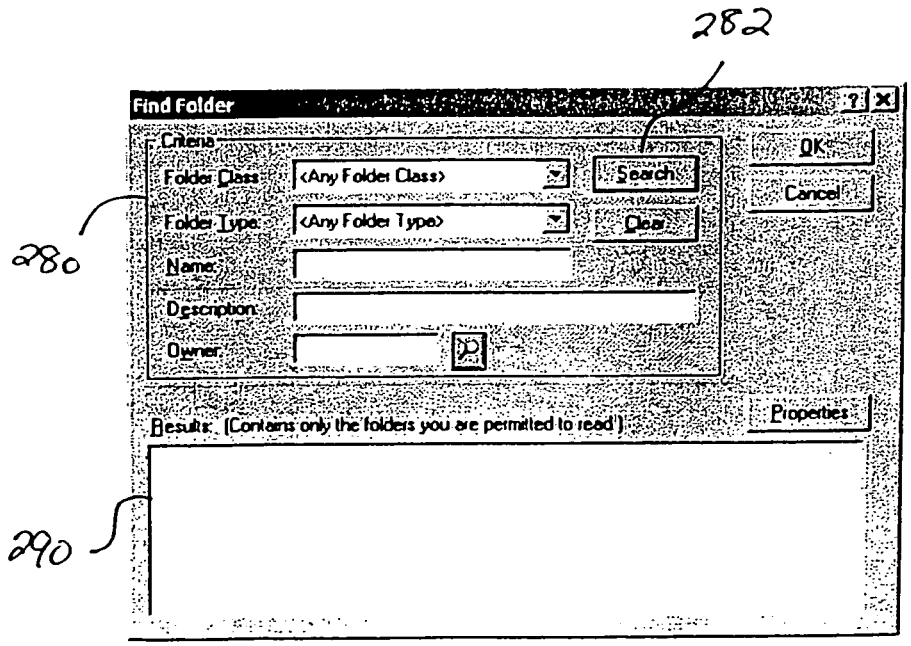
FIG. 17 is a tenth screen display illustrating an example display screen that may be provided to a firm administrator by one of the routines of FIG. 4 for use in managing the changes made to the databases of FIGS. 2, 2A, 2B, 2C, and 3.

Turning now to FIG. 17, there is illustrated an example screen display of a data administrator "Find Folder" display that may be provided to the administrator to assist the administrator in searching for a specific folder. In the illustrated example, a first screen section 280 provides the administrator with a number of different ways to search for a specific folder. For example, the administrator may search by folder class, folder type, folder name, folder description, and/or owner of the folder. Of course, it will be understood that any number of different search criteria may be utilized as desired. Upon entering a search criteria and initiating the search by pressing a search button 282, the "Find Folder" screen display may search the database 24 for all folders matching the specified criteria. The results of the search will be displayed in a second screen section 290, which provides a summary of the identified folders. The administrator may then select a folder from the folders listed in the second summary section 290 to populate the folder name in the second screen section 260 (see FIG. 16).

The following table is an example list of a number of user collection change rules that may be created by an administrator. In the illustrated table, each rule is described and samples of database tables which may correspond to that rule are provided. Of course, the rules and the table database fields and stored values are merely illustrative and may be implemented in any number of differing architectures.

Sample Rules:

| 1. <Firm List>, contact Match - recommended with no expiration | |
|---|---|
| INT_CONTACT_PROMOTE_RULES | Value |
| PROMOTION_RULE_ID | 1 |
| RULE_TYP_IND | 0 - Listing creation |
| FOLDER_ID | 0 - No folder. In the firm list. |
| FOLDER_SRC_ID | 0 - No folder. In the firm list. |
| PROMOTE_ACTION_IND | 3 - Recommended as firm |
| EXPIRE_DAYS | 0 - No expiration |

| 2. Firm Personnel - automatically promote | |
|---|---|
| INT_CONTACT_PROMOTE_RULES | Value |
| PROMOTION_RULE_ID | 2 |
| RULE_TYP_IND | 0 - Listing creation |
| FOLDER_ID | <Firm Personnel folder id> |
| FOLDER_SRC_ID | <Firm Personnel folder source id> |
| PROMOTE_ACTION_IND | 100 - Automatically promote to firm list |
| EXPIRE_DAYS | 0 - No expiration |

| 3. Alumni - recommend that expires in 60 days | |
|---|---|
| INT_CONTACT_PROMOTE_RULES | Value |
| PROMOTION_RULE_ID | 3 |
| RULE_TYP_IND | 0 - Listing creation |
| FOLDER_ID | <Alumni folder id> |
| FOLDER_SRC_ID | <Alumni folder source id> |
| PROMOTE_ACTION_IND | 3 - Recommend as firm |
| EXPIRE_DAYS | 60 (days) |

| 4. Top Client (associated company) - recommend that expires in 60 days | |
|---|---|
| INT_CONTACT_PROMOTE_RULES | Value |
| PROMOTION_RULE_ID | 4 |
| RULE_TYP_IND | 1 - Associated Company |
| FOLDER_ID | <Top client folder id> |
| FOLDER_SRC_ID | <Top client folder source id> |
| PROMOTE_ACTION_IND | 3 - Recommend as firm |
| EXPIRE_DAYS | 60 (days) |

| 5. Client (associated company) - recommend with no expiration | |
|---|---|
| INT_CONTACT_PROMOTE_RULES | Value |
| PROMOTION_RULE_ID | 5 |
| RULE_TYP_IND | 1 - Associated Company |
| FOLDER_ID | <Client folder id> |
| FOLDER_SRC_ID | <Client folder source id> |
| PROMOTE_ACTION_IND | 3 - Recommend as firm |
| EXPIRE_DAYS | 0 - No expiration |

Figure 18:
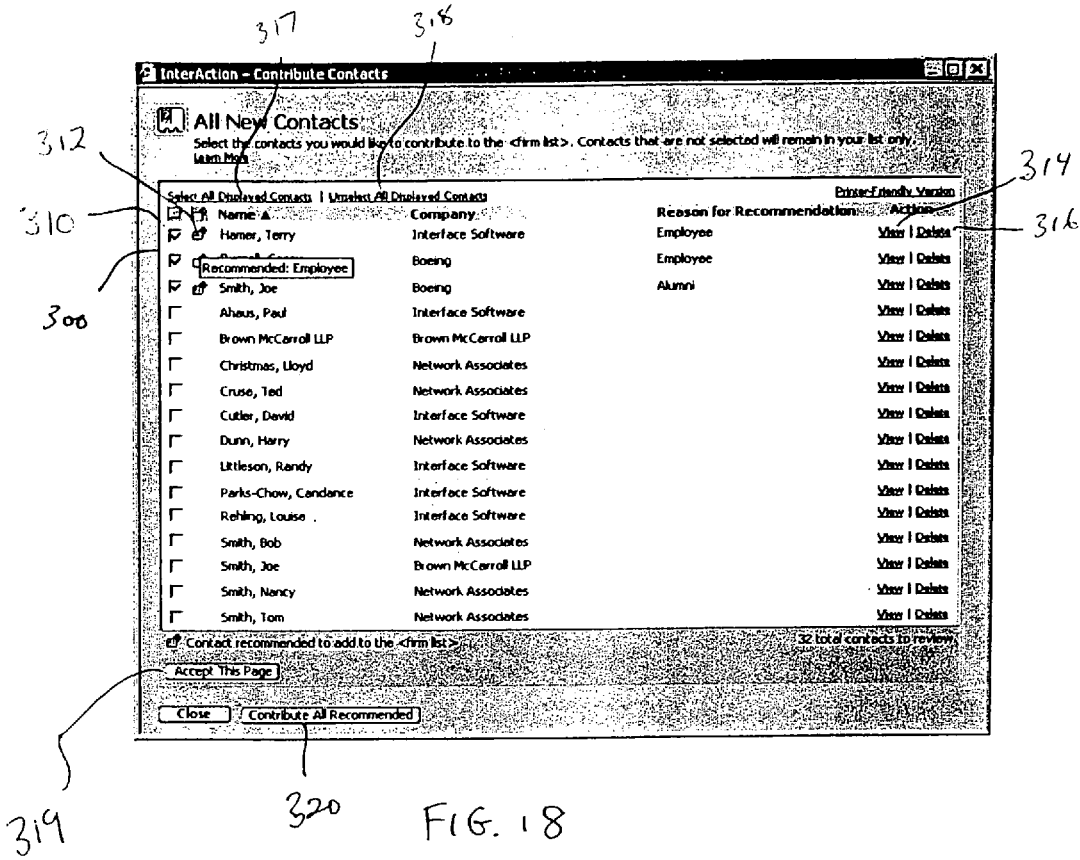
FIG. 18 is an eleventh screen display illustrating an example display screen that may be provided to a user by one of the routines of FIG. 4 for use in managing the changes made to the databases of FIGS. 2, 2A, 2B, 2C, and 3.

FIG. 18 illustrates an example screen display of a user contribution display that may be provided to the user to allow the user to determine which of the changed or new contacts will be added to the firm collection. The screen display may be presented to the user when the user collection change routine 62 determines that the user has made a change to contact information stored in one of the user collections 24a-24n. As illustrated in FIG. 18, a first screen section 300 provides a summary of the pending user contact changes. The summary having, in this example, a contribution checkbox, a recommendation icon, a contact name, a contact company, a reason for a recommendation (if any), and an action (e.g., what additional action the user would like to perform). Of course, other information could be supplied in addition to or instead of that which is described.

In this example, the first contact summary indicates that the user made an addition or a change to the user collection for the contact name "Terry Hamer." In this example, Terry is an employee of Interface Software. The user can decide to contribute or not contribute the information for Terry Hamer by selecting (or unselecting) the contribution checkbox 310 next to the contact name. If the user selects (i.e., checks) the contribution checkbox, the change is made to the firm collection in the manner described above. As illustrated by an icon 312 in the recommendation column, for the first contact summary, a rule previously developed by the administrator has been run against the new contact and has determined that Terry's information should be added to the firm collection by reason of her being an employee of Interface Software. Additionally, the administrator recommends that the user propagate Terry Hamer's contact information to the firm collection. If, however, the user does not choose to add Terry's information to the firm collection, the user simply unselects Terry's record and the system will take no action on the record. Additionally, the user may view Terry's record in a read-only fashion by selecting a "View" hyperlink 314. Alternatively, the user may delete Terry's record by selecting a "Delete" hyperlink 316. As further illustrated in FIG. 18, the user has the ability to select all of the displayed contacts whether recommended to be added to the firm collection or not, as well as to unselect all displayed contacts by choosing the selection hyperlinks 317, 318, respectively. Additionally, as is common with screen displays of this type, the user has the ability to select or unselect each checkbox individually. The user may also sort the grid in any number of ways including, for example, by last name alphabetically with all recommended contributions displayed in the top of the grid as in this illustration. Of course, the grid may be displayed and sorted in any number of preferred ways.

When the user is satisfied with the chosen contacts to be contributed to the firm collection, the user may accept the changes by choosing the "Accept This Page" button 319. As noted, when accepting the contributed contacts, the system will add the user information to the firm collection in the manner previously described. Alternatively, the user may simply close the contribute screen display without performing any actions or may simply choose a "Contribute All Recommended" button 320 to automatically promote all of the recommended contact changes. It will be appreciated, that any of the chosen actions which may result in either deletions, additions or changes to the database may be confirmed with the user by displaying another screen display asking the user if they are sure of their selection (not shown).

Figure 19:
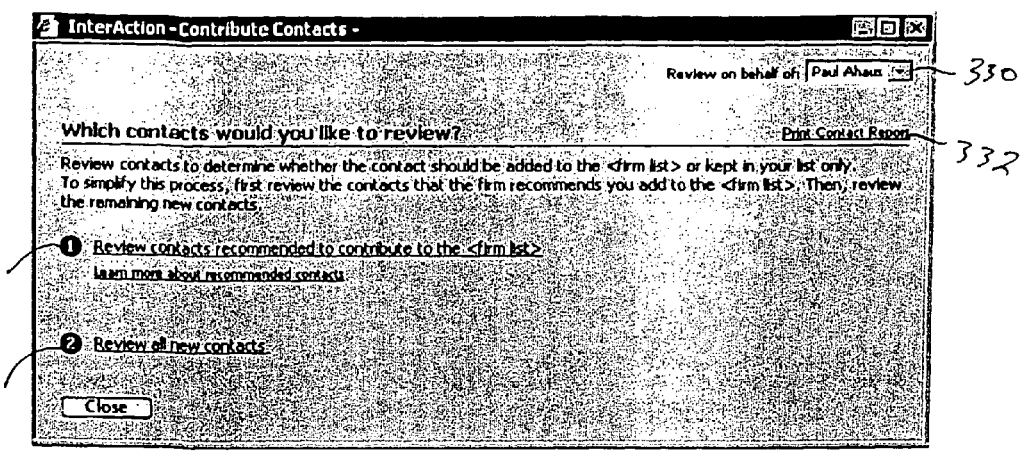
FIG. 19 is a twelfth screen display illustrating an example display screen that may be provided to a user by one of the routines of FIG. 4 for use in managing the changes made to the databases of FIGS. 2, 2A, 2B, 2C, and 3.

FIG. 19 illustrates an example screen display of a contribute contacts selection page that may be provided to a user to prompt the user to review their contacts to determine whether any contacts should be added to the firm collection. As illustrated in FIG. 19, a drop-down list box 330 provides the user with the ability to select which user the contributing reviewer is selecting contacts on behalf of. In this example, the reviewing user will determine which contacts will be added to the firm collection on behalf of Paul Ahaus. It will be appreciated that the reviewing user will be able to make reviews to all users which the reviewing user has access permission for. Once the reviewing user has determined on whose behalf they are making the review, the reviewing user will have a plurality of options available to them. In the illustrated example, the user may select to print a report of all contacts that may be available for addition to the firm collection by selecting the "Print Contact Report" hyperlink 332. The reviewing user may select the recommended contacts by selecting the first hyperlink 334. In this example, the first hyperlink 334 will display a screen similar to that of FIG. 18, different in that it solely lists contacts which are recommended to be contributed to the firm collection. Alternatively, the reviewing user may review all new contacts, including those that are recommended to be added from collection as well as those with no recommendation, by selecting the second hyperlink 336. Once the second hyperlink is selected, a screen similar to that of FIG. 18, including all new contacts will be displayed to the reviewing user. Additionally, the reviewing user may learn more about recommended contacts by selecting the help hyperlink 338, or may simply close the window by selecting the close button 340. Of course, other information and options could be supplied to the reviewing user in addition to or instead of the options identified herein.

In the disclosed embodiment, the system may review the user collection, determine the status of changes to the user collection and send a message to the user that the system has made some recommendations regarding the user collection. For example, the system may send a user an email or other electronic message noting that the system has determined that there are contacts that are recommended to be added to the firm collection. Additionally, the system may periodically review the user collection to re-recommend to the user that there may be users that should e added to the firm collection. In this example, the system may run the stored rules against the user collection, regardless of the user's previous history regarding promotion of contact information, and send a message to the user that some contacts may be recommended for promotion. In this way, the system has the adaptability to keep user' informed of current recommendation regarding their collection.

Many other types of categories of changes and manners of dealing with changes on the part of the data administrator can be provided as well, with the goal being to provide an appropriate level of oversight of changes to the firm collection without overwhelming an administrator. The processing and oversight of changes enables the user of the relationship management system to have confidence in the data coming from the firm collection and thus confidence in the data that is potentially being reflected within that user's collection(s). However, this system also provides the user with the ability to control what changes are made and how changes are made to his or her own contact data as well as the firm collection based on the manner in which the users set the visibility and change flags within his or her collections.

Although the routines described herein, including the change management routines 40, are preferably implemented in software stored in, for example, a memory of a user workstation or user interface or a server, these routines may alternatively or additionally be implemented in hardware, firmware, etc., as desired. If implemented in software, the routines may be stored in any computer readable memory such as on a magnetic disk, a laser disk, an optical disk or other storage medium, in a RAM or ROM of a computer, user interface, workstation or other processing device. Likewise, this software may be delivered to a user or to a processing device via any known or desired delivery method including, for example, over a communication channel such as a telephone line, the Internet, etc.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A relationship management system comprising:
    a first database that stores a plurality of user collections, wherein each user collection is accessible by a user of the system and includes one or more first unique contact files;
    a second database that stores a firm collection, the firm collection including one or more second unique contact files, each second unique contact file having contact data in common with one or more of the first unique contact files;
    a third database that stores one or more rules, each rule including data that matches the contact data in common with one or more of the first unique contact files, the one or more rules defining a strategy for managing a change to the one or more second unique contact files upon detecting a change to the common data of one or more of the first unique contact files within a particular user collection, the changed one or more first unique contact files corresponding to one of the second unique contact files, wherein the changed common data corresponds to one or more contacts other than the user with access to the changed user collection and the strategy includes presenting an option to add or not add the change to the firm collection when the changed common data corresponds to contact data of a first subset of the second unique contact files; and
    a change routine stored in a memory and adapted to be executed on a processor to detect a match between one or more rules and the changed common data of the one or more first unique contact files and to make the change to the common data of a corresponding second unique contact file within the firm collection according to the one or more rules.

2. The relationship management system of claim 1, wherein the change routine includes the third database.

3. The relationship management system of claim 1, wherein the one or more rules are changeable by an administrator.

4. The relationship management system of claim 1, wherein, according to the one or more rules, the change routine specifies that the change made to the first unique contact file is recommended to be made to the second unique contact file, and wherein the change routine is adapted to present an option to allow or reject the recommendation by the change routine.

5. The relationship management system of claim 4, wherein, according to the one or more rules, the change routine is adapted to make the change to the second unique contact file automatically after a specified amount of time.

6. The relationship management system of claim 1, wherein the change routine is further adapted to process the detected change to detect the addition of a new first unique contact file for a contact within one of the user collections for which a further second unique contact file already exists within the firm collection.

7. The relationship management system of claim 1, wherein the change routine is further adapted to process the detected change to detect the addition of a new first unique contact file belonging to a subset for which the contact type already exists within the firm collection.

8. A method of storing information pertaining to a plurality of contacts in a relationship management system used by a multiplicity of users, comprising:
    creating a user collection for each of the multiplicity of users;
    creating a firm collection;
    storing a first contact file for a particular contact within one or more user collections;
    storing a second contact file for the particular contact within the firm collection;
        wherein the first and second contact files include common data;
    detecting a change made to the first contact file common data for the particular contact within one or more of the user collections wherein the changed first contact file common data corresponds to one or more contacts other than the user for which the user collection was created;
    storing one or more change management rules wherein each of the one or more rules includes data that matches the first contact file common data and defines a strategy for managing a change to the one or more second contact files;
    comparing the change made to the first contact file common data to the one or more change management rules; and
    when the comparison of the change and the rule indicates that the change includes common data that is different than the second contact file common data:
        presenting an option to modify the second contact file with the changed common data when the common data includes contact data of a first subset of the second contact files; and
        saving the changed common data to the first contact file when the common data includes contact data of a second subset of the second contact files;
    wherein the one or more subsets include one or more of a firm list contact, firm personnel, alumni, top clients, clients, or a company associated with a client.

9. The method of claim 8, wherein automatically modifying the second contact file with the changed common data includes notifying one of the multiplicity of users of the change.

10. The method of claim 9, wherein notifying one of the multiplicity of users of the change includes enabling the user to accept or reject the change to be made to the firm collection.

11. The method of claim 8, further including notifying one of the multiplicity of users of the change made to the first contact file common data for the particular contact within one of the user collections and enabling the user to accept or reject the corresponding change to be made to the second contact file of the firm collection.

12. The method of claim 8, wherein the change made to the first contact file common data for the particular contact within one of the user collections includes adding a new contact within one of the user collections.

13. The relationship management system of claim 1, wherein the first and second subsets of the one of more second contact files includes one or more contact folders.

14. The method of claim 8, wherein the one or more subsets of the plurality of second contact files includes one or more contact folders.

* * * * *